United States Patent
Lee et al.

(10) Patent No.: US 12,481,022 B2
(45) Date of Patent: Nov. 25, 2025

(54) SYSTEM AND METHOD OF EMULATING ECHO SIGNALS FROM EMULATED TARGETS WITH REDUCED INTERFERENCE FROM REFLECTION

(71) Applicant: Keysight Technologies, Inc., Santa Rosa, CA (US)

(72) Inventors: Gregory S. Lee, Mountain View, CA (US); Natalie Killeen, Sebastopol, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 225 days.

(21) Appl. No.: 18/273,400

(22) PCT Filed: Jan. 28, 2021

(86) PCT No.: PCT/US2021/015483
§ 371 (c)(1),
(2) Date: Jul. 20, 2023

(87) PCT Pub. No.: WO2022/164434
PCT Pub. Date: Aug. 4, 2022

(65) Prior Publication Data
US 2024/0111023 A1 Apr. 4, 2024

(51) Int. Cl.
*G01S 7/40* (2006.01)
*G01S 7/03* (2006.01)
(Continued)

(52) U.S. Cl.
CPC ............ *G01S 7/4086* (2021.05); *G01S 7/032* (2013.01); *G01S 7/354* (2013.01); *G01S 13/931* (2013.01);
(Continued)

(58) Field of Classification Search
CPC ............ H01Q 1/3233; H01Q 21/0075; H01Q 21/065; H01Q 9/28; G01S 13/931; G01S 7/032; G01S 7/354; G01S 7/4086
See application file for complete search history.

(56) References Cited

U.S. PATENT DOCUMENTS

| 4,901,080 A | 2/1990 | McHenry |
| 5,892,479 A * | 4/1999 | Mills ..................... G01S 7/4052 342/170 |

(Continued)

FOREIGN PATENT DOCUMENTS

| JP | H06148313 A | 5/1994 |
| JP | 2003139844 A | 5/2003 |

(Continued)

OTHER PUBLICATIONS

International Search Report and Written Opinion dated Oct. 20, 2021, 11 pgs.

(Continued)

*Primary Examiner* — Peter M Bythrow

(57) ABSTRACT

A system and method emulate an echo signal from an emulated target in response to a radar signal from a radar DUT. The system includes an antenna configured to receive the radar signal, and to direct a reflected portion of the radar signal away from an incident direction of the radar signal at a predetermined deflection angle to prevent the radar DUT from receiving the reflected portion; and a transceiver configured to provide an RF signal having an RF frequency shifted from a frequency of the radar signal in an amount indicating a distance to the emulated target, and to transmit the RF signal to the radar DUT as an emulated echo signal. An antenna pattern includes a peak beam angled away from a normal incidence of the antenna at a beam squint angle that (Continued)

compensates for the predetermined deflection angle to direct the peak beam toward the radar DUT.

20 Claims, 10 Drawing Sheets

(51) Int. Cl.
G01S 7/35 (2006.01)
G01S 13/931 (2020.01)
H01Q 1/32 (2006.01)
H01Q 21/06 (2006.01)

(52) U.S. Cl.
CPC ......... *H01Q 1/3233* (2013.01); *H01Q 21/065* (2013.01)

(56) References Cited

U.S. PATENT DOCUMENTS

| | | | |
|---|---|---|---|
| 6,075,480 A * | 6/2000 | Deliberis, Jr. | G01S 7/4052 342/194 |
| 7,136,012 B2 | 11/2006 | Wasiewicz | |
| 10,505,646 B2 * | 12/2019 | Kyosti | H04B 7/0617 |
| 10,527,715 B2 * | 1/2020 | Ahmed | G01S 7/4052 |
| 10,613,198 B2 * | 4/2020 | Vacanti | G01R 29/105 |
| 11,841,455 B1 * | 12/2023 | Arool Emmanuel | G01S 7/4013 |
| 2006/0158369 A1 * | 7/2006 | Shinoda | H01Q 3/06 342/146 |
| 2009/0289864 A1 * | 11/2009 | Derneryd | H01Q 21/0018 343/893 |
| 2010/0109940 A1 * | 5/2010 | Williams | G01S 7/4052 342/171 |
| 2012/0223855 A1 | 9/2012 | Kurono et al. | |
| 2017/0363719 A1 * | 12/2017 | Ahmed | G01S 7/4052 |
| 2018/0003799 A1 | 1/2018 | Yang et al. | |
| 2018/0306904 A1 * | 10/2018 | Vacanti | G01S 7/4056 |
| 2018/0337738 A1 * | 11/2018 | Wen | H04B 17/21 |
| 2019/0033428 A1 * | 1/2019 | Rowell | G01V 3/12 |
| 2021/0055384 A1 * | 2/2021 | Lee | G01S 13/931 |
| 2022/0018934 A1 * | 1/2022 | Lee | G01S 7/4034 |

FOREIGN PATENT DOCUMENTS

| | | |
|---|---|---|
| JP | 2010048673 A | 3/2010 |
| JP | 2012208034 A | 10/2012 |
| JP | 2015148607 A | 8/2015 |
| JP | 2015158607 A | 9/2015 |
| KR | 20150063639 A | 6/2015 |
| WO | 2006046432 A1 | 5/2006 |
| WO | 2017175190 A1 | 10/2017 |

OTHER PUBLICATIONS

Michael Ernst Gadringer et al., "Radar target stimulation for automotive applications", IET Radar, Sonar, and Navigation, 2018, vol. 12, Issue 10, pp. 1-8.

Werner Scheiblhofer et al., "A Low-Cost Multi-Target Simulator for FMCW Radar System Calibration and Testing", Proceedings of the 14th European Radar Conference, Oct. 11-13, 2017, Nuremberg, Germany, pp. 343-346.

Hsueh-Jyh Li et al., "Radar and Inverse Scattering", The Electrical Engineering Handbook, 2005, Section 10.4 "Radar Cross Section", https://www.sciencedirect.com/topics/engineering/radar-cross-section, pp. 1-20.

Nicholas K. Host et al., "Low cost beam-steering approach for a series-fed array", Proc. IEEE Int. Symp. Phased Array Syst. Technologies., Oct. 2013, pp. 293-300.

Wael A. Ahmad et al., "Beam squinting in wideband 60 GHz on-board series-fed differential patch arrays", Proc. IEEE Asia Pacific Microw. Conf. (AMPC), Nov. 2017, pp. 13-16.

Stefan Beer et al., "Coplanar 122-GHz Antenna Array With Air Cavity Reflector for Integration in Plastic Packages", IEEE Antennas Wireless Prop. Letter, Mar. 2012, vol. 11, pp. 160-163.

Japanese Office Action dated Nov. 29, 2024, application No. 2023-545336, 4 pgs.

Japanese Notice of Allowance dated Jul. 15, 2025, application No. 2023-545336, 6 pgs.

* cited by examiner

SYSTEM AND METHOD OF EMULATING ECHO SIGNALS FROM EMULATED TARGETS WITH REDUCED INTERFERENCE FROM REFLECTION

CROSS REFERENCE TO RELATED APPLICATIONS

The present application is the U.S. National Phase application under 35 U.S.C. § 371 of, and claims priority from, International Application No. PCT/US2021/015483 filed on Jan. 28, 2021, and published as WO2022164434A1 on Aug. 4, 2022. The entire disclosure of PCT/US2021/015483 is specifically incorporated by reference herein.

BACKGROUND

Advanced driver-assistance systems (ADASs) and autonomous driving systems for vehicles rely on detection and ranging systems that use detection and ranging electromagnetic signals, including millimeter wave radar signals, for example. The radar signals are used to warn of forward collisions and backward collisions, to implement adaptive cruise control and autonomous parking, for example, and ultimately to perform autonomous driving on streets and highways. ADASs are promising due to low cost, and the ability to operate at night or in inclement weather conditions (e.g., fog, rain, snow, dust).

Conventional automotive radar systems typically have multiple transmitters and receivers on an ego vehicle. Actual driving environments in which the radar systems may be deployed can vary greatly, and many such driving environments may be complex. For example, actual driving environments may contain numerous objects, some of which may have complicated reflection, diffraction and multi-time reflection characteristics that affect echo signals responsive to the radar signals. The immediate consequences of incorrectly sensing and/or interpreting echo signals may be that false warnings or improper reactions are triggered or warnings or reactions that should be triggered are not, which in turn can lead to collisions. Therefore, reliable testing of radar systems is important.

However, road testing of ADASs and autonomous driving systems may be problematic and expensive. Few local governments allow road testing of automated systems. Therefore, the road testing does not offer much in the way of variety with regard to driving scenarios. Also, local governments that do allow road testing typically require an emergency driver in the driver seat in case the automated system were to make a critical error, as well as another person in the front passenger seat who helps to monitor the emergency driver's actions and to log other observations. This adds additional expense to the road testing. Consequently, auto manufacturers and radar module vendors are eager to electronically emulate driving conditions, in order to simulate a wide variety of driving scenarios, without the need for permission from local governments, and to save the cost of the emergency driver and the extra passenger.

Generally, conventional systems for emulating an echo signal reflected from multiple emulated targets include simulators that attempt to emulate the physics of the problem. For example, conventional simulators may receive a radar signal transmitted from a radar under test, delay the radar signal by an amount corresponding to propagation delay resulting from range to the emulated target, scale amplitude of the radar signal to account for the range and radar cross section (RCS) of the target, and then retransmit the scaled and delayed signal back to the radar under test, thereby emulating the transmission of the radar signal from the radar under test to the target and reflection of a corresponding echo signal.

However, in addition to return signals (emulated echo signals) from the emulated radar targets, the conventional simulators generate unwanted extraneous signals, which may be referred to as "ghost targets." For example, receive/transmit antennas physically arranged in front of simulator pixels are not perfect absorbers, and therefore reflect portions of the radar signal. The reflected portions present nonzero RCSs at the setup range and angles of arrival (AoAs) of the antennas themselves. For example, patch array antennas in particular require use of ground planes, which are main contributors to the unwanted RCSB. The ghost targets may cause the radar under test to incorrectly conclude that emulated radar targets are present at the setup range (which may be less than a meter away from the radar under test), and may otherwise interfere with proper detection of the emulated radar targets themselves and/or control of the ego vehicle in response to the detected emulated radar targets.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
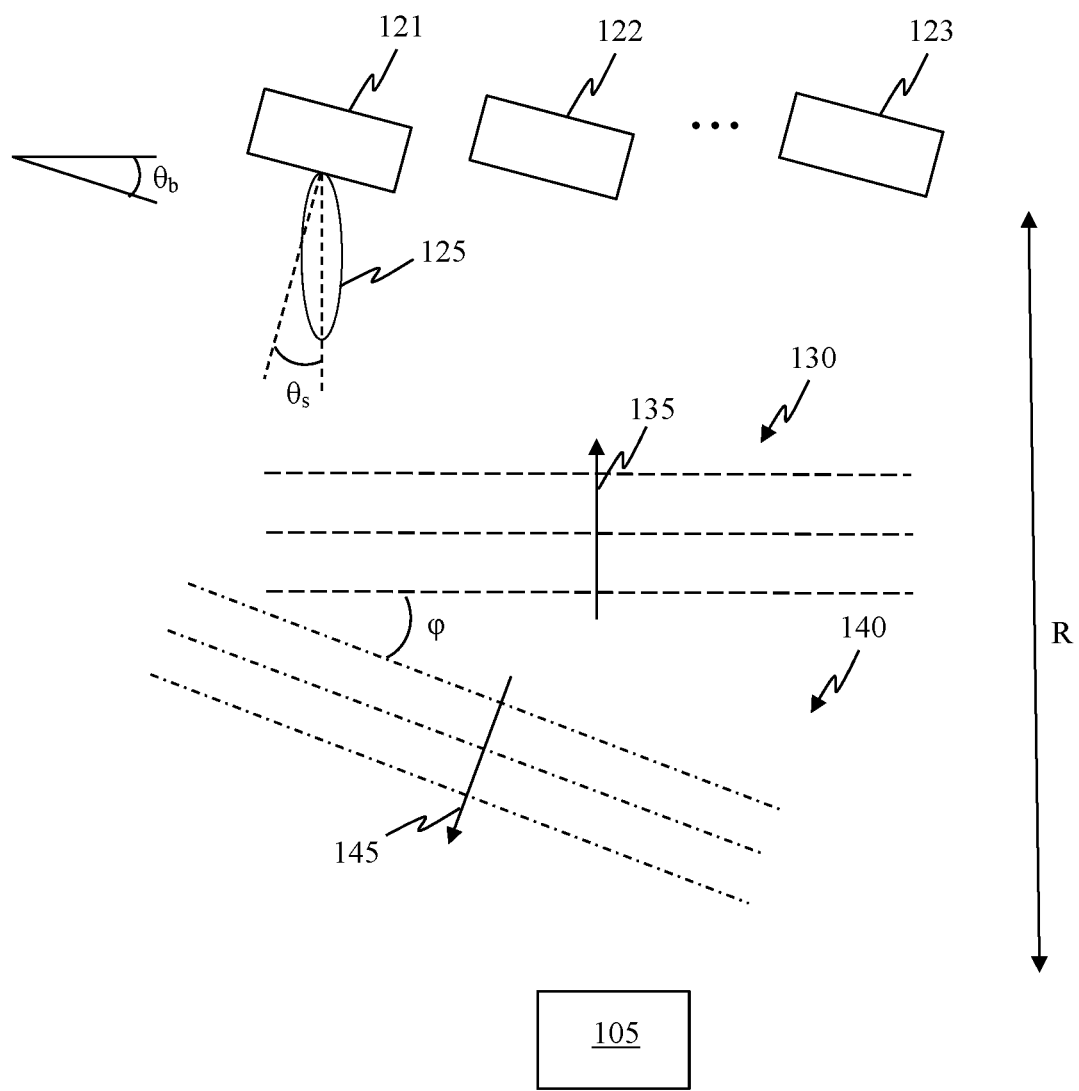
FIG. 1 is a simplified block diagram showing a system for emulating echo signals for a radar device under test (DUT) with reduced interference from reflection, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Generally, a drive emulation system is provided that emulates echo signals from emulated radar targets responsive to radar signal transmissions from a radar device under test (DUT), arranged on a vehicle under test, such as an automobile or other mobile platform. The embodiments minimize interference from ghost targets, such as radar signals reflected from transmit/receive antennas and other system hardware, by directing the reflected radar signals away from the radar DUT. This prevents the radar DUT from erroneously determining that the reflected radar signals represent emulated radar targets.

According to a representative embodiment, a system is provided for emulating an echo signal reflected from an emulated radar target in response to a radar signal transmitted by a radar DUT. The echo signal emulation system includes antennas configured to receive the radar signal over-the-air from the radar DUT. Each of the antennas reflects a portion of the radar signal, and is configured to direct the reflected portion of the radar signal away from an incident direction of the radar signal at a predetermined deflection angle in order to prevent the radar DUT from receiving the reflected portion of the radar signal. The incident direction is substantially perpendicular to a wavefront of the radar signal transmitted by the radar DUT. For example, the antennas may be patch array antennas, each of which includes patch elements arranged in an array and a ground plane mirror, where the array together with it ground plane are canted at a blaze angle from the incident direction of the radar signal. Of course, other types of antennas may be incorporated without departing from the scope of the present teachings.

The echo signal emulation system further includes transceivers coupled to the antennas to receive the radar signal, where each transceiver is configured to mix the received radar signal radar signal with a locally generated signal having a frequency that provides as output a radio frequency (RF) signal having an RF frequency shifted from a radar frequency of the radar signal in an amount indicating a distance to the emulated target, and to transmit the RF signal to the radar DUT as an emulated echo signal via the antennas. Each antenna has an antenna pattern including a peak beam angled away from a normal incidence of the antenna at a beam squint angle, where the beam squint angle compensates for the predetermined deflection angle in order to direct the peak beam toward the radar DUT for receiving the radar signal and transmitting the RF signal. In this case, the beam squint angle is the same value as the blaze angle, but facing in the opposite direction, and the predetermined deflection angle is about twice the blaze angle.

According to another representative embodiment, a method is provided for emulating an echo signal reflected from an emulated target in response to a radar signal transmitted by a radar DUT. The method includes angling at least one antenna of an RTS at a blaze angle with respect to an incidence direction of a radar signal to be transmitted by the radar DUT, where the at least one antenna is outside a near-field of the radar DUT (e.g., in the mid-field or far-field); adjusting an antenna pattern of the at least one antenna to angle a peak beam of the antenna pattern away from a normal incidence of the at least one antenna at a beam squint angle; receiving a radar signal over-the-air from the radar DUT using the adjusted antenna pattern, and reflecting a portion of the radar signal away from the incident direction of the radar signal at a predetermined deflection angle due to the blaze angle of the at least one antenna to prevent the radar DUT from receiving the reflected portion of the radar signal; mixing the received radar signal with a locally generated signal having a frequency that provides an RF signal having an RF frequency shifted from a radar frequency of the radar signal in an amount indicating a distance to the emulated target; and transmitting the RF signal to the radar DUT as an emulated echo signal via the at least one antenna using the adjusted antenna pattern. The beam squint angle compensates for the predetermined deflection angle in order to direct the peak beam toward the radar DUT for receiving the radar signal and transmitting the RF signal.

FIG. 1 is a simplified block diagram showing a system for emulating echo signals for a radar DUT with reduced interference (e.g., elimination of ghost targets), according to a representative embodiment.

Referring to FIG. 1, a system 100 include multiple radar targets simulators (RTSs) located at a setup range R from a radar under test or radar DUT 105 in a test chamber, such as an anechoic chamber, for example. The setup range R is outside the near-field of the radar DUT 105, e.g., at a mid-field or far-field range, in order to receive the radar signals and transmit corresponding emulated echo signals. For example, the setup range R is at least about 0.75 meter from the radar DUT 105. The multiple RTSs include representative first RTS 121, second RTS 122 and $n^{th}$ RTS 123, which are arranged in a planar array with respect to one another. It is understood, however, that the first, second and $n^{th}$ RTSs 121, 122 and 123 may be arranged in a non-planar fashion, without departing from the scope of the present teachings. For example, the first, second and $n^{th}$ RTSs 121, 122 and 123 may form a curved array, such as cylindrical or spherical array, in which the radar DUT 105 is positioned at the center of curvature, as described for example by U.S. patent application Ser. No. 17/157,160 by Gregory S. Lee et al., filed Jan. 25, 2021, the contents of which are hereby incorporated by reference in their entirety.

Each of the first, second and $n^{th}$ RTSs 121, 122 and 123 includes hardware and software configured to receive radar signals from the radar DUT 105, and to generate emulated echo signals (return signals) reflected from emulated radar targets in a scene simulation in response to the received radar signals. For example, each of the first, second and $n^{th}$ RTSs 121, 122 and 123 may include one or more antennas, a transceiver, and a signal generator, as described below with reference to FIG. 3, although any type of compatible RTS may be incorporated without departing from the scope of the present teachings. The one or more antennas may be patch array antennas, for example, each of which includes patch elements arranged in a two-dimensional array. In an illustrative embodiment, each of the first, second and $n^{th}$ RTSs 121, 122 and 123 may include a receive (Rx) patch array antenna for receiving the radar signal from the radar DUT 105 and a transmit (Tx) patch array antenna for (re)transmitting the emulated echo signals to the radar DUT 105. It is assumed that at least a portion of each of the first, second and $n^{th}$ RTSs 121, 122 and 123 presents a substantially planar face, as indicated in FIG. 1. For example, each of the Rx patch array antenna and the Tx patch array antenna includes a ground plane mirror that presents a substantially planar face.

The radar DUT 105 transmits a radar signal, indicated by radar wavefront 130, in an incident direction 135 perpendicular to the radar wavefront 130. The first, second and $n^{th}$ RTSs 121, 122 and 123 are arranged in a blazed array, meaning that they are canted (tilted) at a slight blaze angle θ, so that the corresponding substantially planar faces are angled away from the incident direction 135 of the radar signal. The first, second and $n^{th}$ RTSs 121, 122 and 123 do not absorb all of the radar signal from the radar DUT 105, and therefore a portion of the radar signal, e.g., at the carrier frequency, is reflected (scattered) from the first, second and $n^{th}$ RTSs 121, 122 and 123, indicated by reflected wavefront 140, in a normal incidence 145 from the second and $n^{th}$ RTSs 121, 122 and 123 perpendicular to the reflected wavefront 140. The reflected portion of the radar signal is directed away from the incident direction 135 of the radar signal at a predetermined deflection angle φ, which in the depicted configuration is equal to twice the blaze angle θ (20). The blaze angle θ is large enough such that the reflected portion of the radar signal is not received or otherwise detected by the radar DUT 105, thereby preventing the appearance of ghost targets based on the reflected portion. For example, since the setup range R places the first, second and $n^{th}$ RTSs 121, 122 and 123 in the mid-field or far-field, the blaze angle θ may be relatively small, e.g., in the range of about 5 degrees to about 25 degrees. The value of the blaze angle θ also depends the angular distance that peak beams of respective antenna patterns can be squinted, as discussed below.

When each of the first, second and $n^{th}$ RTSs 121, 122 and 123 includes one or more patch array antennas, the reflected portion of the radar signal reflects from the ground plane, as mentioned above. However, the reflected portion also reflects from all surfaces parallel to the ground planes, such as the patch elements, top surface of the dielectric on which the patch elements are arranged, imperfect RTS radomes, and the like.

A drawback of canting the first, second and $n^{th}$ RTSs 121, 122 and 123 is that the respective antenna patterns of the corresponding antennas are likewise canted, such that the radar DUT 105 may no longer be positioned within peak beams of these antenna patterns. That is, referring to the first RTS 121 for purposes of illustration, when the antenna(s) has peak directivity at the normal incidence 145, the cant of the first RTS 121 results in a loss of gain with regard to receiving the radar signal from the radar DUT 105 and/or transmitting the emulated echo signals to the radar DUT 105. For example, when the one-way gain reduction is about 2 dB, the net emulation loss is about 4 dB due to the reduced signal strength in both the receive and transmit directions.

To compensate for this undesirable consequence, the antenna pattern of each of the first, second and $n^{th}$ RTSs 121, 122 and 123 are modified using beam squinting. Beam squinting is the intentional peaking of directivity of an antenna pattern at an angle departing from normal incidence of the antenna. In the depicted embodiment, beam squinting has been performed on the first RTS 121 so that peak beam 125 of the antenna pattern is angled away from the normal incidence 145 of the antenna in the first RTS 121 at beam squint angle $\theta_s$, thereby compensating for the blaze angle $\theta_b$ of the first RTS 121, and ultimately for the predetermined deflection angle φ of the reflected portion of the radar signal. The beam squint angle $\theta_s$ directs the peak beam 125 toward the radar DUT 105 for receiving the radar signal and transmitting the emulated echo signal. In an embodiment, the beam squint angle $\theta_s$ is equal to the blaze angle $\theta_b$ in the compensating direction. The peak beam 125 is representative of both receive and transmit antenna patterns, regardless of whether the first RTS 121 has one antenna for both receiving and transmitting, or has separate Rx and Tx antennas, as discussed above. Accordingly, the first RTS 121 receives and (re)transmits favorably in the direction of the radar DUT 105, while still preventing the appearance of ghost targets. In the depicted configuration, it is assumed that the first, second and n$^{th}$ RTSs 121, 122 and 123 have the same antenna pattern and are canted the same amount. Therefore, the beam squinting for the first, second and n$^{th}$ RTSs 121, 122 and 123 would be the same.

When the antenna of the first RTS 121 is a patch array antenna, the beam squinting may be performed by adjusting a strategic phase relationship between adjacent rows of patch elements to increase radiation in a desired direction. The phase relationship may be controlled using phase shifters, for example, to steer the peak beam 125, or the phase relationship may remain fixed. For purposes of illustration, it is assumed that the phase relationship of the patch array antenna is fixed.

Figure 2:
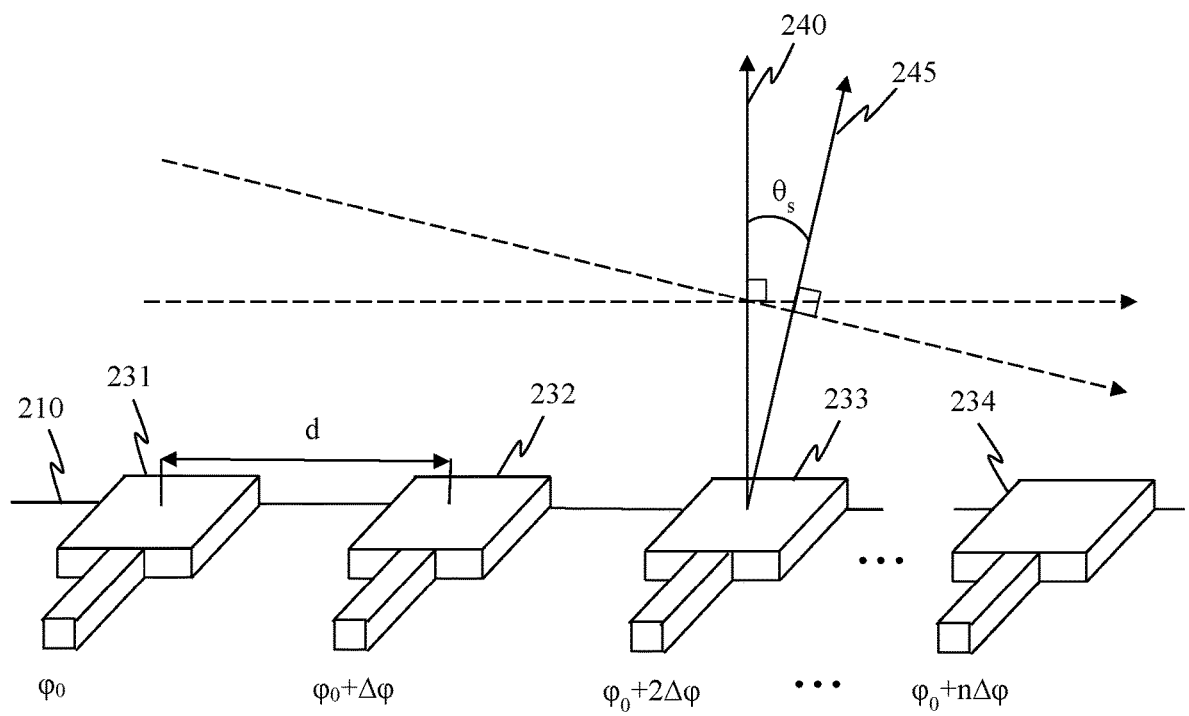
FIG. 2 is a simplified block diagram of a patch array antenna of a radar target simulator (RTS) (e.g., first RTS 121) in a system for emulating echo signals for a radar DUT, according to a representative embodiment.

FIG. 2 is a simplified block diagram of a patch array antenna in an RTS (e.g., first RTS 121) in a system for emulating of echo signals for a radar DUT, according to a representative embodiment.

Referring to FIG. 2, a patch array antenna 221 is shown to include three representative patch elements, first patch element 231, second patch element 232, third patch element 233 and nth patch element 234, in a single row of a patch of array for purposes of illustration. It is understood that the patch array antenna 221 may include fewer or more than three patch elements, which may be arranged in various size arrays, without departing from the scope of the present teachings. Also for purposes of illustration, the first, second, third and nth patch elements 231, 232, 233 and 234 are in a horizontal arrangement, and separated by a predetermined distance d.

The first patch element 231 has a phase $\varphi_0$, which is an input phase of the received or transmitted signal, and each consecutive adjacent patch element in the same row is configured to an iterative phase change of $\Delta\varphi$. That is, the second patch element 232 has a phase $\varphi_0+\Delta\varphi$, the third patch element 233 has a phase $\varphi_0+2\Delta\varphi$, and third patch element 233 has a phase $\varphi_0+(n-1)\Delta\varphi$. When the phase change of $\Delta\varphi$ is zero (i.e., all the patch element have the same phase), a peak beam of the patch array antenna 221 is substantially perpendicular (broadside) to the ground plane mirror 210 of the patch array antenna 221, indicated by arrow 240, in which case there is no squinting of the peak beam. When the phase change of $\Delta\varphi$ is non-zero, the peak beam of the patch array antenna 221 is squinted by a beam squint angle $\theta_s$ in accordance with Equation (1):

$$\Delta\varphi = \frac{2\pi}{\lambda} d \sin\theta_S \quad \text{Equation (1)}$$

In Equation (1), λ is the wavelength of the center frequency of the received radar signal or the transmitted emulated echo signal, and d is the distance between adjacent patch elements in the same row of the array. When the phase change $\Delta\varphi$ is positive (as shown in the example of FIG. 2), the beam squint angle $\theta_s$ is also positive (to the right of the broadside arrow 240), indicated by arrow 245. When the phase change $\Delta\varphi$ is negative, the beam squint angle $\theta_s$ is also negative (to the left of the broadside arrow 240).

In an embodiment, the patch elements are arranged in parallel microstrips extending from one or more feedlines, where the microstrips provide columns and the patch elements adjacent to one another on corresponding microstrips provide rows of the patch array antenna. The phase changes at the different microstrips may be implemented by a matching network having different line lengths feeding the different microstrips respectively.

Figure 3B:
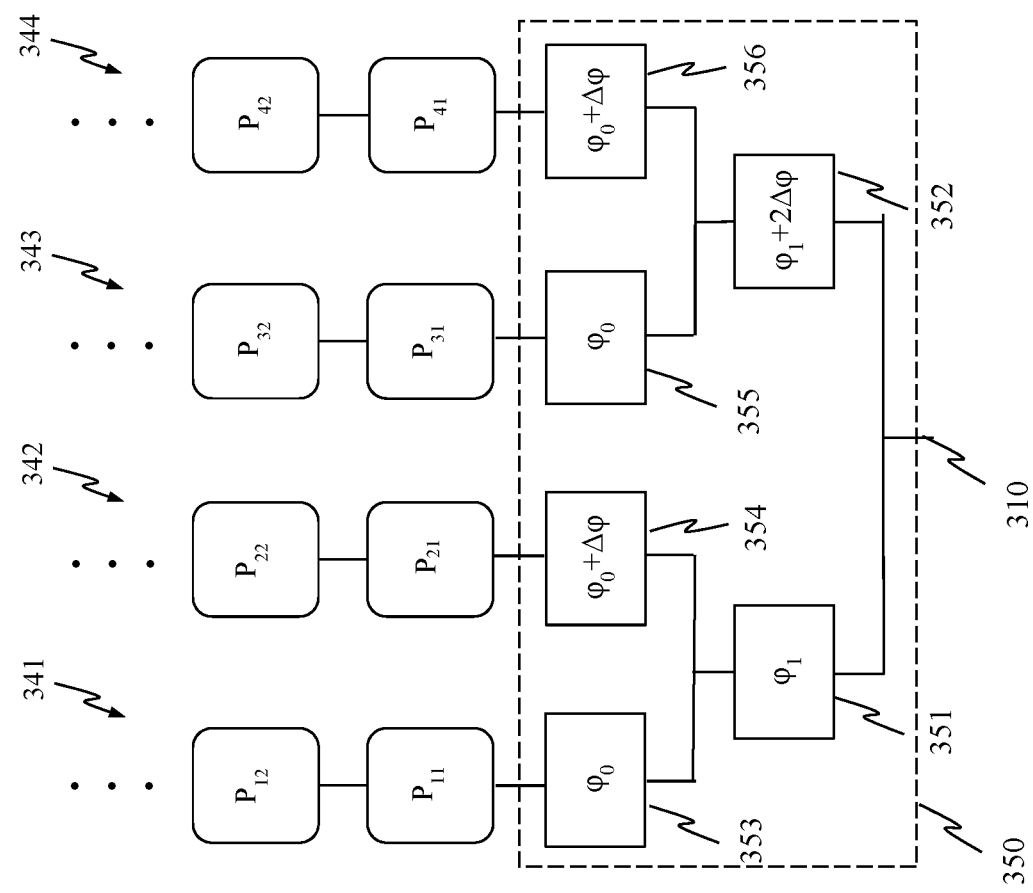
FIG. 3B is a simplified block diagram of a portion of the unbalanced patch array antenna in FIG. 3A showing implementation of a matching circuit for the horizontal beam squinting, according to a representative embodiment.
Figure 3A:
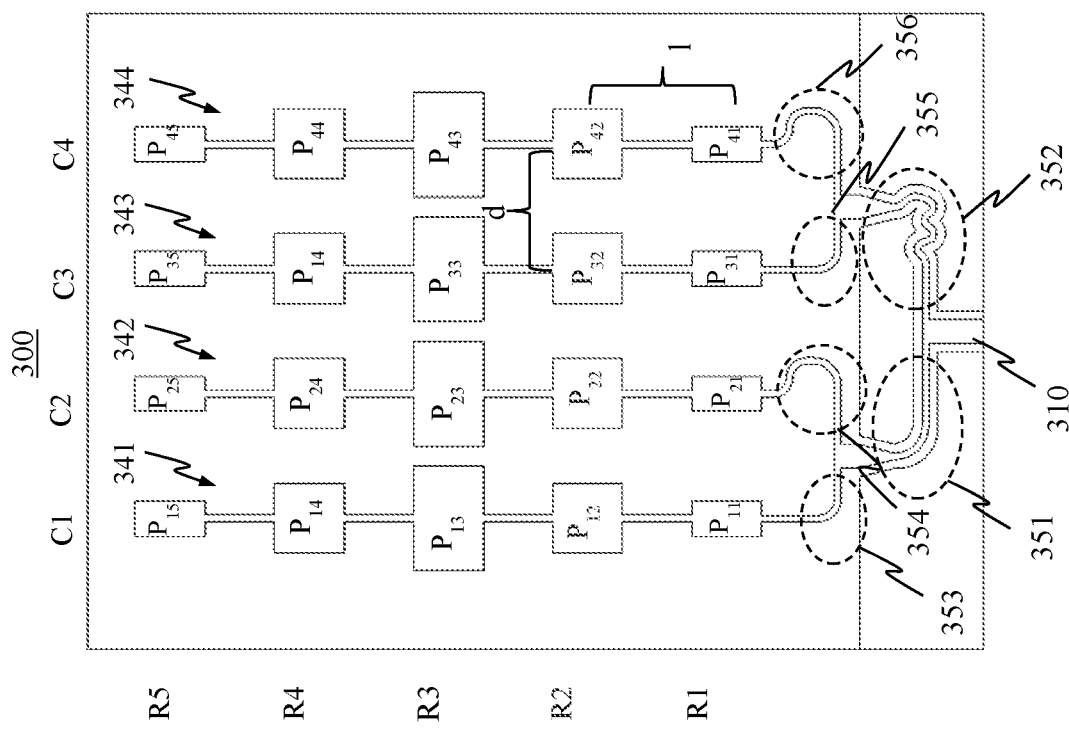
FIG. 3A is a simplified schematic diagram of an example of an unbalanced patch array antenna of an RTS for horizontal beam squinting, according to a representative embodiment.

FIG. 3A is a simplified schematic diagram of an example of an unbalanced patch array antenna of an RTS for horizontal beam squinting, according to a representative embodiment. FIG. 3B is a simplified block diagram of a portion of the unbalanced patch array antenna in FIG. 3A showing implementation of a matching circuit for horizontal beam squinting, according to a representative embodiment.

Referring to FIG. 3A, unbalanced patch array antenna 300 includes a feedline 310, a matching circuit 350, and patch elements $P_{11}$ to $P_{45}$ connected to the matching circuit 350 along four microstrips 341, 342, 343 and 344. The patch elements $P_{11}$ to $P_{45}$ are arranged in an array format comprising four parallel columns C1, C2, C3 and C4 (corresponding to the microstrips 341-344), and five parallel rows R1, R2, R3, R4 and R5, for purposes of illustration. Of course, alternative array sizes may be incorporated without departing from the scope of the present teachings. The feedline 310 provides an unbalanced signal for the unbalanced patch array antenna 300. The feedline 310 connects to the matching circuit 350, which includes matching feedlines connecting to the microstrips 341-344, respectively. The matching feedlines have different lengths to provide different phases, as discussed below. Adjacent patch elements in the same row (e.g., patch elements $P_{32}$ and $P_{42}$ in row R2) are separated equally by distance d, and adjacent patch elements in the same column (e.g., patch elements $P_{41}$ and $P_{42}$ in column C4) are equally separated by length l. The length l is the same is it would be for an unbalanced patch array antenna configured to provide a broadside beam peak. So, the horizontal squinting provided by the unbalanced patch array antenna 300 is a function of the different phases provided to the microstrips 341-344 by the matching circuit 350.

Referring to FIG. 3B, the matching circuit 350 includes multiple phase shifters connected to the microstrips 341-344 corresponding to the columns C1, C2, C3 and C4, respectively. In the depicted embodiment, the unbalanced feedline 310 is split into first phase shifter 351, which provides an arbitrary phase $\varphi_i$, and second phase shifter 352, which provides the arbitrary phase $\varphi_1$ with the phase change $2\Delta\varphi$ ($\varphi_1+2\Delta\varphi$). The first phase shifter 351 is connected to third phase shifter 353, which provides the phase $\varphi_0$, and fourth phase shifter 354, which provides the adjusted phase $\varphi_0+\Delta\varphi$. The second phase shifter 352 is similarly connected to fifth phase shifter 355, which provides the phase $\varphi_0$, and sixth phase shifter 356, which provides the adjusted phase $\varphi_0+\Delta\varphi$. The phase and/or phase adjustment provided by each of the first to sixth phase shifters 351-356 is a function of the line length of each of the matching feedlines in the matching circuit 350, as mentioned above. These line lengths are shown in FIG. 3A by dashed ovals labeled to correspond with the first to sixth phase shifters 351-356.

In the representative embodiment depicted in FIGS. 3A and 3B, the peak beam of the unbalanced patch array antenna 300 is squinted to the right by a squint angle (positive squinting), since the columns C1-C4 of patch elements $P_{11}$-$P_{45}$ have increasing total phase adjustments (increasing lengths of matching lines) from left to right, as in FIG. 2, for example. Alternatively, the peak beam of the unbalanced patch array antenna 300 may squinted to the left by a squint angle (negative squinting) by increasing the total phase adjustments of the columns C1-C4 from right to left. Generally, for either squint direction, the greater the amount of phase adjustment $\Delta\varphi$ between adjacent columns C1-C4, the greater the resulting squint angle.

Figure 4B:
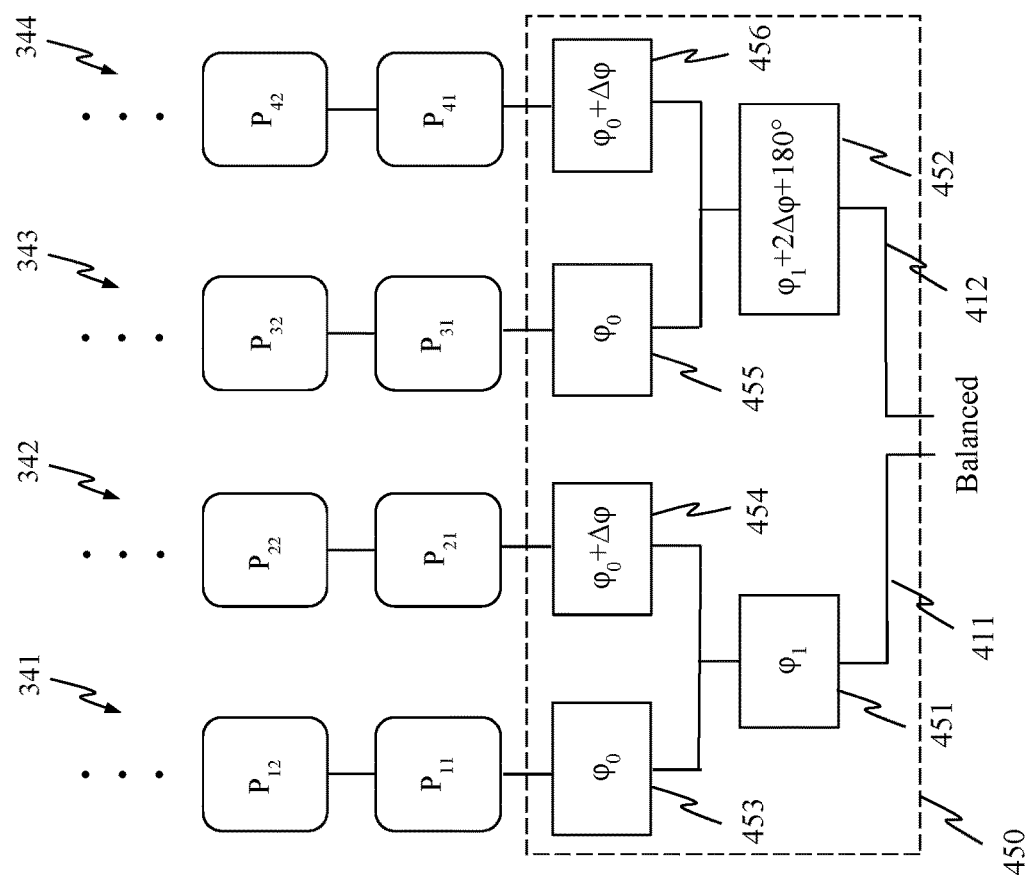
FIG. 4B is a simplified block diagram of a portion of the balanced patch array antenna in FIG. 4A showing implementation of a matching circuit for the horizontal beam squinting, according to a representative embodiment.
Figure 4A:
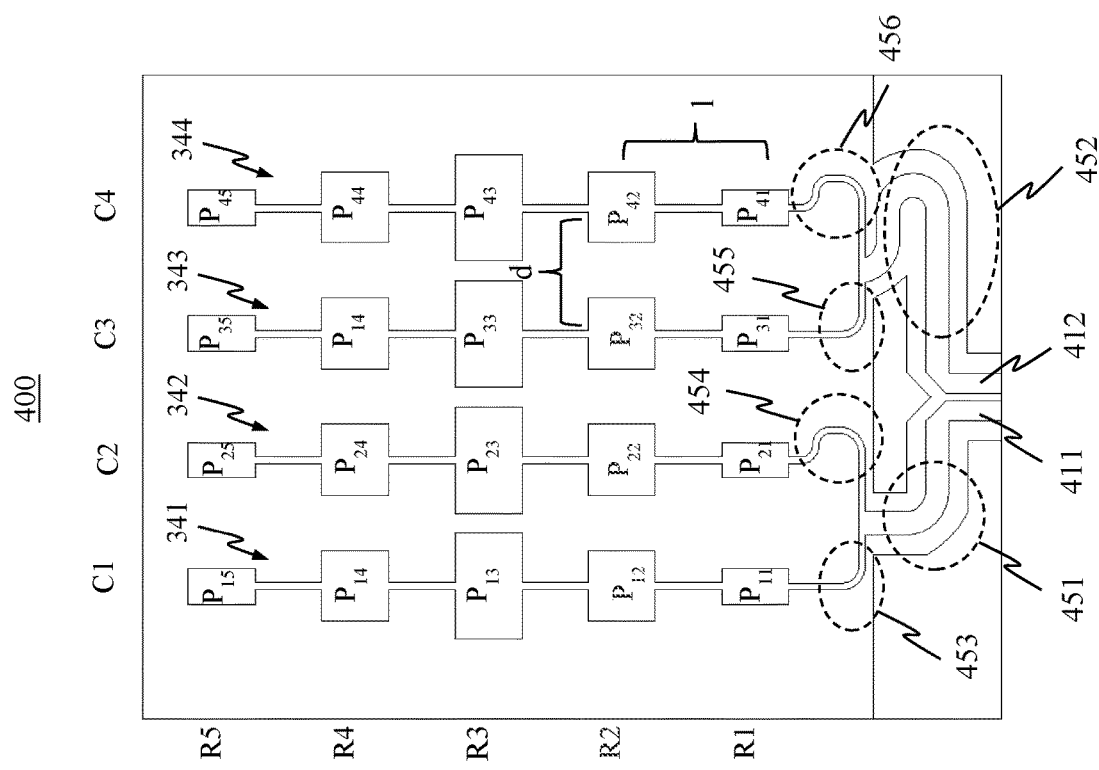
FIG. 4A is a simplified schematic diagram of an example of a balanced patch array antenna of an RTS for horizontal beam squinting, according to a representative embodiment.

FIG. 4A is a simplified schematic diagram of an example of a balanced patch array antenna of an RTS for horizontal beam squinting, according to a representative embodiment. FIG. 4B is a simplified block diagram of a portion of the balanced patch array antenna in FIG. 4A showing implementation of a matching circuit for horizontal beam squinting, according to a representative embodiment.

Referring to FIG. 4A, balanced patch array antenna 400 includes feedlines 411 and 412, a matching circuit 450, and patch elements $P_{11}$ to $P_{45}$ connected to the matching circuit 450 along four microstrips 341, 342, 343 and 344. The feedlines 411 and 412 provide a differential signal for the balanced patch array antenna 400. The feedlines 411 and 412 connect to the matching circuit 450, which includes matching feedlines connecting to the microstrips 341-344, respectively. As in FIGS. 3A and 3B, the horizontal squinting provided by the balanced patch array antenna 400 is a function of the different phases provided to the microstrips 341-344 by the matching circuit 450.

Referring to FIG. 4B, the matching circuit 450 includes multiple phase shifters connected to the microstrips 341-344 corresponding to the columns C1, C2, C3 and C4, respectively. In the depicted embodiment, the balanced feedline 411 connects to first phase shifter 451, which provides an arbitrary phase $\varphi_1$, and the balanced feedline 412 connects second phase shifter 452, which provides the arbitrary phase $\varphi_1$ with the phase change $2\Delta\varphi$ plus 180 degrees to account for the differential signal ($\varphi_1 + 2\Delta\varphi + 180°$). The first phase shifter 451 is connected to third phase shifter 453, which provides the phase $\varphi_0$, and fourth phase shifter 454, which provides the adjusted phase $\varphi_0 + \Delta\varphi$. The second phase shifter 452 is similarly connected to fifth phase shifter 455, which provides the phase $\varphi_0$, and sixth phase shifter 456, which provides the adjusted phase $\varphi_0 + \Delta\varphi$. The line lengths of each of the first to sixth phase shifters 451-456 are shown in FIG. 4A by dashed ovals labeled to correspond with the first to sixth phase shifters 451-456.

In the representative embodiment depicted in FIGS. 4A and 4B, the peak beam of the balanced patch array antenna 400 is squinted to the right by a squint angle (positive squinting), since the columns C1-C4 of patch elements $P_{11}$-$P_{45}$ have increasing phase adjustments from left to right. Alternatively, the peak beam of the balanced patch array antenna 400 may squinted to the left by a squint angle (negative squinting) by increasing the phase adjustments of the columns C1-C4 from right to left.

Figure 5B:
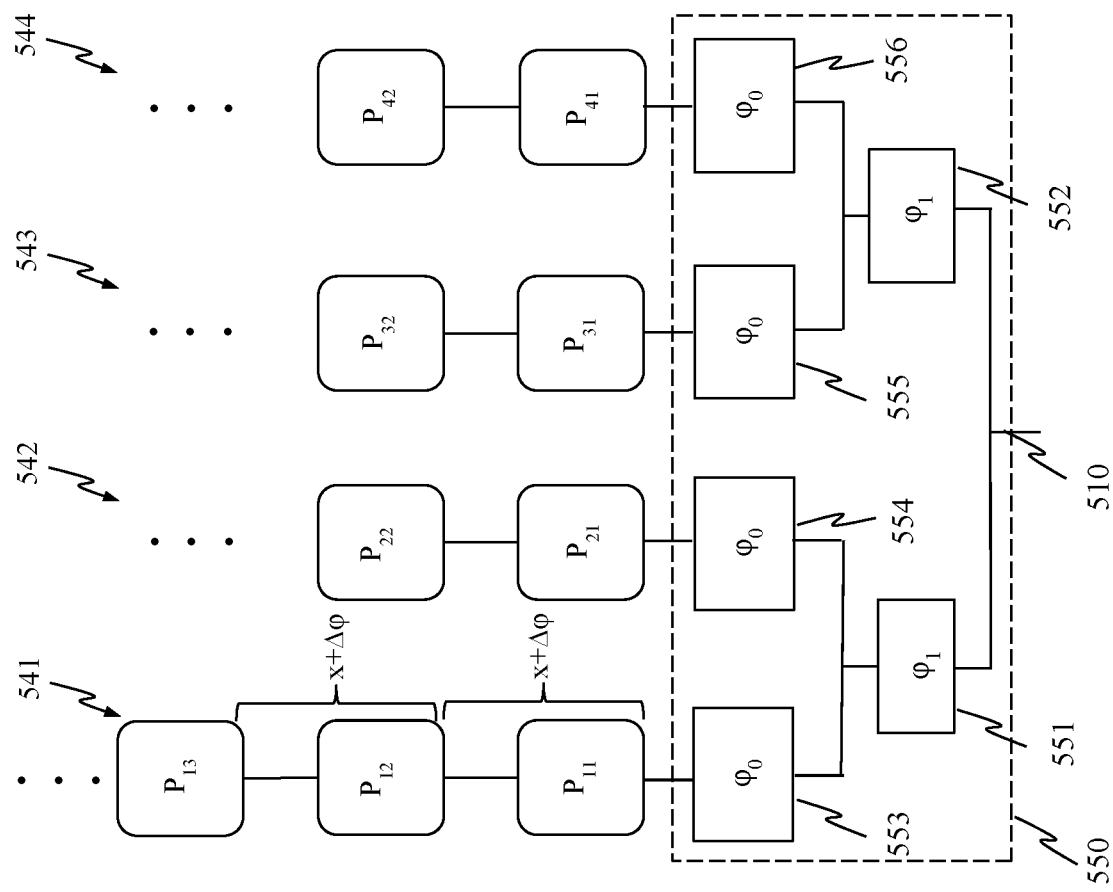
FIG. 5B is a simplified block diagram of a portion of the unbalanced patch array antenna in FIG. 5A showing implementation of a matching circuit for the vertical beam squinting, according to a representative embodiment.
Figure 5A:
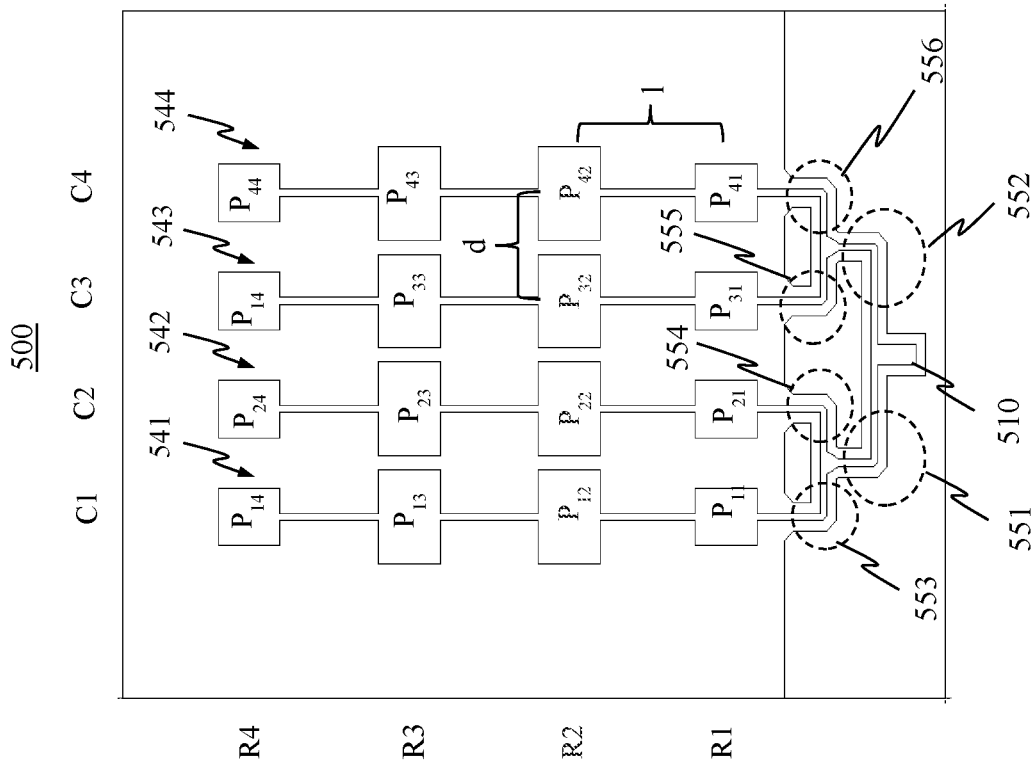
FIG. 5A is a simplified schematic diagram of an example of an unbalanced patch array antenna of an RTS for vertical beam squinting, according to a representative embodiment.

FIG. 5A is a simplified schematic diagram of an example of an unbalanced patch array antenna of an RTS for vertical beam squinting, according to a representative embodiment. FIG. 5B is a simplified block diagram of a portion of the unbalanced patch array antenna in FIG. 5A showing implementation of a matching circuit for vertical beam squinting, according to a representative embodiment.

Referring to FIG. 5A, unbalanced patch array antenna 500 includes a feedline 510, a matching circuit 550, and patch elements $P_{11}$ to $P_{44}$ connected to the matching circuit 550 along four microstrips 541, 542, 543 and 544. The patch elements $P_{11}$ to $P_{44}$ are arranged in an array format comprising four parallel columns C1, C2, C3 and C4 (corresponding to the microstrips 541-544), and five parallel rows R1, R2, R3 and R4, for purposes of illustration. Of course, alternative array sizes may be incorporated without departing from the scope of the present teachings. The feedline 510 provides an unbalanced signal for the unbalanced patch array antenna 500. The feedline 510 connects to the matching circuit 550, which includes matching feedlines connected to the microstrips 541-544, respectively. Adjacent patch elements in the same row (e.g., patch elements $P_{32}$ and $P_{42}$ in row R3) are separated equally by distance d, and adjacent patch elements in the same column (e.g., patch elements $P_{41}$ and $P_{42}$ in column C4) are equally separated by length l. That is, the rows R1, R2, R3 and R4 are arranged in parallel across the microstrips 541-544, where adjacent rows are offset an electrical degree distance from one another (indicated by length l) to produce a phase gradient between the adjacent rows to provide the vertical beam squint angle of the patch array antenna 500.

Notably, the length l separating the adjacent patch elements in the same column determines the amount of upward or downward squint provided by the unbalanced patch array antenna 500. That is, when the length l is longer (as shown in FIG. 5A) than a nominal length separating the adjacent patch elements required to provide a broadside beam peak, the unbalanced patch array antenna 500 provides an upward (positive) beam squint. Conversely, when the length l is shorter than the nominal length, the unbalanced patch array antenna 500 provides a downward (negative) beam squint. So, the vertical squinting provided by the unbalanced patch array antenna 500 is a function of the value of the length l separating the patch elements on each of the microstrips 541-544.

Referring to FIG. 5B, the matching circuit 550 includes multiple phase shifters connected to the microstrips 541-544 corresponding to the columns C1, C2, C3 and C4, respectively. In microstrip 541, for example, patch element $P_{11}$ is separated from patch element $P_{12}$, by length $x + \Delta x$, patch element $P_{12}$ is also separated from patch element $P_{13}$, by length $x + \Delta x$, where x is the nominal full guide wavelength $\lambda_g$, e.g., of the microstrip or coplanar waveguide (CPW), for example. The value of x is shorter than free-space wavelength $\lambda$ due to the dielectric constant of the substrate being greater than 1. Then, $\Delta x = *\Delta_g / 2\pi$, where $\Delta\varphi$ is the same as discussed above with reference to Equation (1) for horizontal beam squinting. In the depicted embodiment, the unbalanced feedline 510 is split into first phase shifter 551 and second phase shifter 552, each of which provides an arbitrary phase $\varphi_1$. The first phase shifter 551 is connected to third phase shifter 553 and fourth phase shifter 554, each of which provides phase $\varphi_0$. Likewise, the second phase shifter 521 is connected to fifth phase shifter 555 and sixth phase shifter 556, each of which also provides phase $\varphi_0$. The phases of the various sets of phase shifter are the same to provide phase matching. The phases are provided by line lengths, which are shown in FIG. 5A by dashed ovals labeled to correspond with the first to sixth phase shifters 551-556. The vertical squinting provided by the unbalanced patch array antenna 500 is a function of the length l, as stated above.

As described above, in the representative embodiment depicted in FIGS. 5A and 5B, the peak beam of the unbalanced patch array antenna 500 is squinted upward by a squint angle, since the length l separating the adjacent patch elements $P_{11}$-$P_{44}$ on the microstrips 541-544 is longer than a nominal length that would otherwise provide no squinting. Alternatively, the peak beam of the unbalanced patch array antenna 500 may be squinted downward by a squint angle by reducing the length l to shorter than the nominal length that would provide no squinting. Generally, for either squint direction, the greater the difference between the length l and the nominal length, the greater the resulting upward or downward squint angle.

Figure 6B:
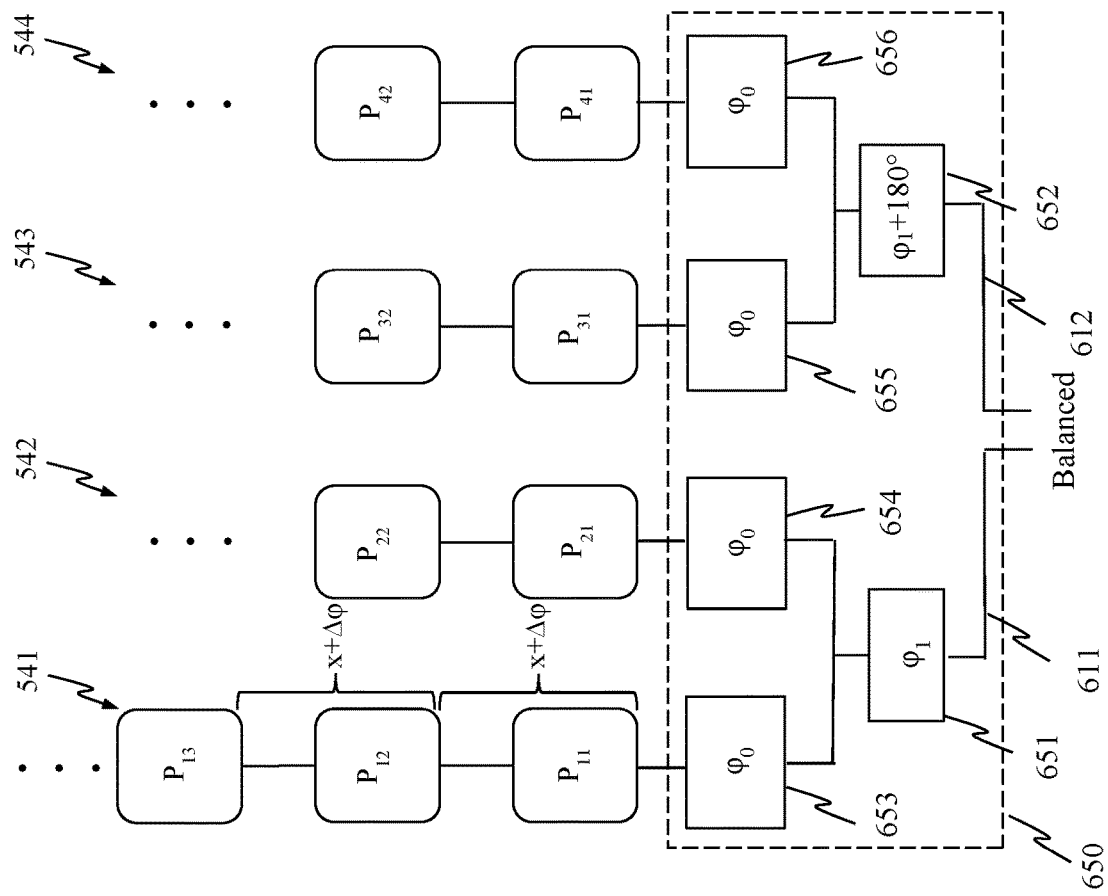
FIG. 6B is a simplified block diagram of a portion of the balanced patch array antenna in FIG. 6A showing implementation of a matching circuit for the vertical beam squinting, according to a representative embodiment.
Figure 6A:
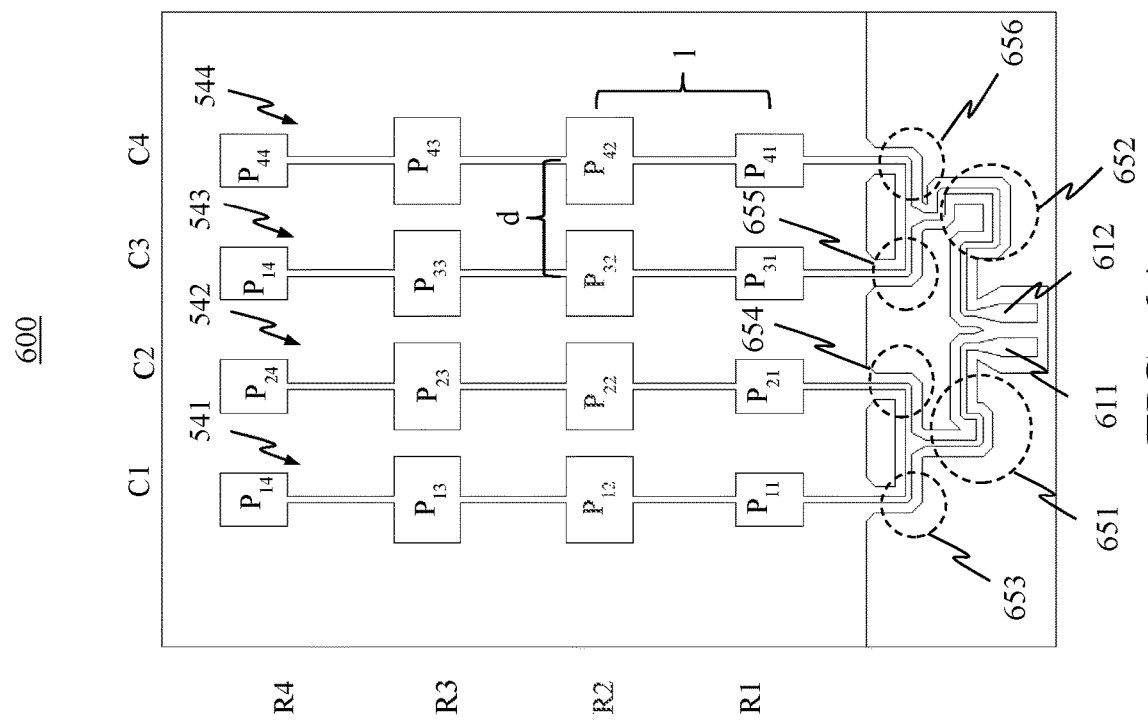
FIG. 6A is a simplified schematic diagram of an example of a balanced patch array antenna of an RTS for vertical beam squinting, according to a representative embodiment.

FIG. 6A is a simplified schematic diagram of an example of a balanced patch array antenna of an RTS for vertical beam squinting, according to a representative embodiment. FIG. 6B is a simplified block diagram of a portion of the balanced patch array antenna in FIG. 6A showing implementation of a matching circuit for vertical beam squinting, according to a representative embodiment.

Referring to FIG. 6A, balanced patch array antenna 600 includes a feedlines 611 and 612, a matching circuit 650, and patch elements $P_{11}$ to $P_{44}$ connected to the matching circuit 650 along four microstrips 541, 542, 543 and 544. The feedlines 611 and 612 provide a differential signal for the balanced patch array antenna 600. The feedlines 611 and 612 connect to the matching circuit 650, which includes matching feedlines connecting to the microstrips 541-544, respectively, to provide the desired phase. Again, the vertical squinting provided by the balanced patch array antenna 600 is a function of the length l between adjacent patch elements $P_{11}$ to $P_{44}$ on the microstrips 541-544. That is, when the length l is longer (as shown in FIG. 6A) than a nominal length separating the adjacent patch elements required to provide a broadside beam peak, the balanced patch array antenna 600 provides an upward (positive) beam squint. Conversely, when the length l is shorter than the nominal length, the balanced patch array antenna 600 provides a downward (negative) beam squint.

Referring to FIG. 6B, the matching circuit 650 includes multiple phase shifters connected to the microstrips 541-544 corresponding to the columns C1, C2, C3 and C4, respectively. In the depicted embodiment, the balanced feedline 611 is connected to first phase shifter 651, which provides an arbitrary phase $\varphi_1$. The balanced feedline 612 is connected second phase shifter 652, which provides the arbitrary phase $\varphi_1$ plus 180 degrees to account for the differential signal ($\varphi_1$+180). The first phase shifter 651 is connected to third phase shifter 653 and fourth phase shifter 654, each of which provides phase $\varphi_0$. Likewise, the second phase shifter 621 is connected to fifth phase shifter 655 and sixth phase shifter 656, each of which also provides phase $\varphi_0$. The phases are provided by line lengths, which are shown in FIG. 6A by dashed ovals labeled to correspond with the first to sixth phase shifters 651-656. In the representative embodiment depicted in FIGS. 6A and 6B, the peak beam of the balanced patch array antenna 600 is squinted upward (positive beam squinting), since the length l separating the adjacent patch elements $P_{11}$-$P_{45}$ on the microstrips 541-544 is longer than a nominal length that would otherwise provide no squinting. Alternatively, the peak beam of the balanced patch array antenna 600 may be squinted downward (negative beam squinting) by reducing the length l to be shorter than the nominal length that would provide no squinting.

Figure 7:
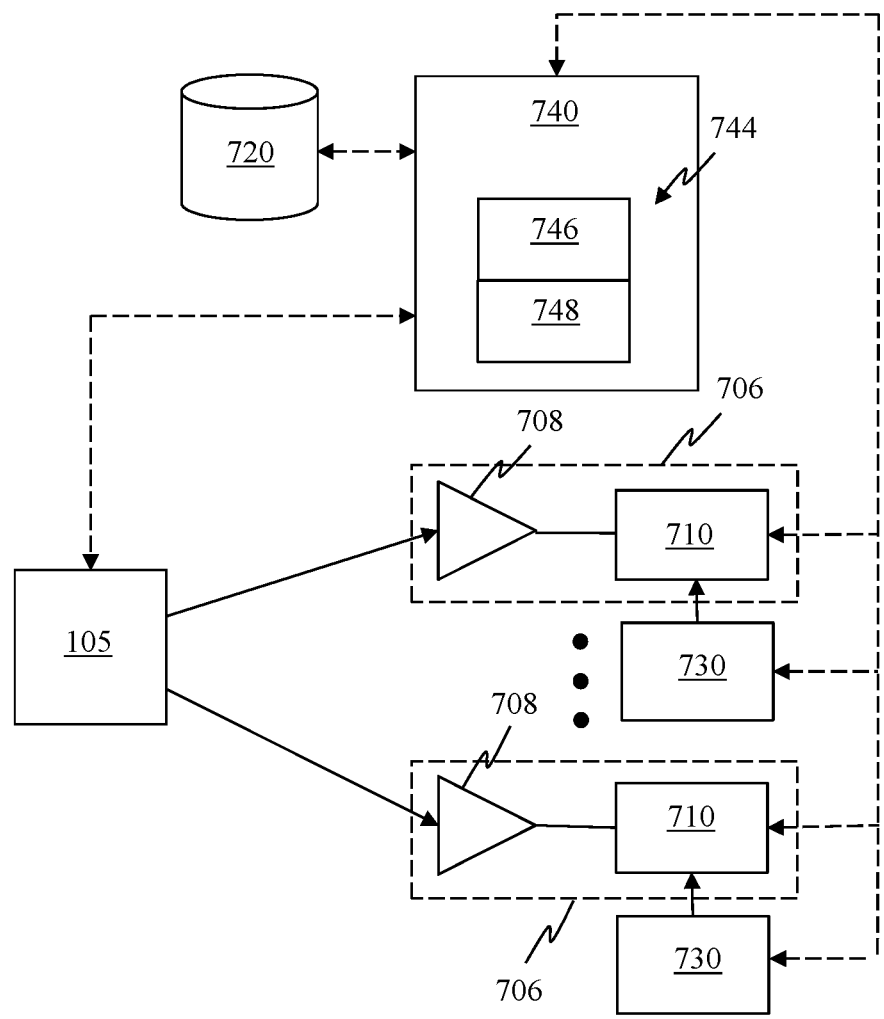
FIG. 7 is a simplified block diagram showing a system for emulating echo signals with reduced interference, according to a representative embodiment.

As stated above, the RTSs and corresponding one or more antennas may be incorporated in a drive emulation system that emulates echo signals from emulated radar targets responsive to radar signal transmissions from a radar DUT. FIG. 7 is a simplified block diagram showing an illustrative system for emulating echo signals for a radar DUT with reduced interference (e.g., elimination of ghost targets), according to a representative embodiment. As will be appreciated by one of ordinary skill in the art having the benefit of the present disclosure, one likely vehicular radar is automobile radar used in various capacities in current and emerging automobile applications. Another emulation example is in-vehicle person detection systems, in which the radar is configured to detect the presence or absence of people/children/pets in potentially harmful situations, such as in a parked car with windows up on a hot, sunny day, for example. However, it is emphasized that the presently described echo signal emulation system is not limited to automobile radar systems, and can be applied to other types of vehicles that could employ a vehicular radar system, including trucks, busses, motorcycles, bicycles, motorized bicycles (e.g., scooters), and aircraft, for example.

Referring to FIG. 7, the echo signal emulation system 700 is arranged to test radar DUT 105, which may be configured to transmit frequency modulated continuous wave (FMCW) radar signals and to receive return signals, including emulated echo signals emulating reflections (echoes) of the radar signals from targets in a scene emulation. The echo signal emulation system 700 may also work with some phase modulated continuous wave (PMCW) systems, as well. The radar DUT 105 has one or more radar transmitters and corresponding transmit antennas, as well as one or more radar receivers and corresponding receive antennas. All or part of the system 700 may be included in a test chamber, such as an anechoic test chamber.

The system 700 includes multiple re-illuminators 706, each of which includes at least one antenna 708 and at least one RTS 710. The RTS 710 may be a frequency offset transceiver or a mini-RTS (mRTS), for example. The antenna 708 may be a patch antenna array or a cavity backed antenna, for example, as discussed above. As discussed in more detail below, each RTS (frequency offset transceiver) 710 generally includes a receiver circuit, a transmitter circuit, an in-phase (I)-quadrature (Q) mixer (I/Q mixer). A signal generator 730 generates I and Q signals that are input to the I/Q mixer and mixed with the radar signal. The signal generator 730 may be a direct digital synthesizer (DDS), or a field-programmable gate array (FPGA) and a digital-to-analog converter (DAC), for example. The I/Q mixer may be considered part of both the receiver and transmitter circuits. A received radar signal may be input to the I/Q mixer as a local oscillator (LO) signal at an LO port, and the I and Q signals generated by the signal generator 730 may be input to the I/Q mixer as an intermediate frequency (IF) signal at an IF port, for example. A mixing product of the LO and IF signals may be output by the I/Q mixer as an RF signal at an RF port, for example, where the RF signal has an RF frequency that is slightly shifted from the carrier frequency of the radar signal. The RF signal is amplified/attenuated as needed, and transmitted by the transmitter circuit to the radar DUT 105 via the antenna 708 as the emulated echo signal. For FMCW radar signals, the frequency and magnitude of the emulated echo signal indicates emulated ranges and RCSs of the emulated targets. For example, for an FMCW radar signal using a chirp signal, the lower the frequency difference between the RF frequency of the emulated echo signal within the linear ramp of the chirp signal and the emulated echo signal, the closer the emulated target appears to be to the radar DUT 105. Generally, distance information is extracted from the frequency difference and RCS information is provided by the magnitude of the emulated echo signal.

In an alternative configuration, the signal generators 730 may not be physically included in each of the re-illuminators 706, in which case one signal generator 730 may provide the I and Q signals for multiple RTSs 710, without departing from the scope of the present teachings. In this configuration, the signal generator 730 may be implemented using a single source capable of creating independent I and Q signal frequencies for each RTS 710, such as the FPGA and the DAC, for example.

There may be one re-illuminator 706 for each emulated target in the scene emulation. Alternatively, one re-illuminator 706 may be used for multiple emulated targets, including one or more diffuse targets and/or one or more non-diffuse targets. In an embodiment, the re-illuminators 706 may be arranged in a 2-D array, where each re-illuminator 706 represents an element in the 2-D array. In this case, the elements having a spatial position that corresponds to an emulated target would generate an emulated echo signal corresponding to that target.

The system 700 also includes a computer 740 with a controller 744. The controller 744 described herein may include a combination of memory 746 that stores instructions and an illustrative processor 748 that executes the stored instructions in order to implement all or part of the processes described herein. A database 720 may store information to be used for target emulation, including various predetermined scenarios that have one or more targets. For example, the database 720 may store desired characteristics of a point target, such as the range from the radar DUT 105, the RCS, velocity, acceleration, and the like. The database 720 may further store information regarding parameters of the particular radar DUT 105, such as codes, power, fields of view, and the like. The radar DUT 105 may be connected to the computer 740 by various types of wired and/or wireless network connections. The controller 744 is configured to control operations of RTSs 710, as well as the signal generators 730 via control signals, indicated by dashed lines.

The controller 744 may be housed within or linked to a workstation such as a computer or another assembly of one or more computing devices, a display/monitor, and one or more input devices (e.g., a keyboard, joysticks and mouse) in the form of a standalone computing system, a client computer of a server system, a desktop or a tablet. The term "controller" broadly encompasses all structural configurations, as understood in the art of the present disclosure and as exemplarily described in the present disclosure, of an application specific main board or an application specific integrated circuit for controlling application of various principles as described in the present disclosure. The structural configuration of the controller 144 may include, but is not limited to, processor(s), computer-usable/computer readable storage medium(s), an operating system, application module(s), peripheral device controller(s), slot(s) and port(s), as discussed below.

Additionally, although the computer 740 and/or the controller 744 show components networked together, multiple components may be integrated into a single system. For example, the computer 740 and/or the controller 744 may be integrated with a display (not shown) and/or with the system 700. On the other hand, the networked components of the computer 740 and/or the controller 744 may also be spatially distributed such as by being distributed in different rooms or different buildings, in which case the networked components may be connected via data connections. In still another embodiment, one or more of the components of the computer 740 and/or the controller 744 is not connected to the other components via a data connection, and instead is provided with input and/or output manually such as by a memory stick or other form of memory. In yet another embodiment, functionality described herein may be performed based on functionality of the elements of the computer 740 and/or the controller 744 but outside the system 700.

In the depicted embodiment, the computer 740 includes the controller 744, which includes memory 746, processor 748, as well as user and/or network interfaces (not shown) and a display (not shown). The computer 740 and/or the controller 744 may be implemented as a processing unit. In various embodiments, the processing unit may include one or more computer processors (e.g., processor 748), digital signal processors (DSPs), central processing units (CPUs), field-programmable gate arrays (FPGAs), application specific integrated circuits (ASICs), or combinations thereof, using any combination of hardware, software, firmware, hard-wired logic circuits, or combinations thereof. Each of the computer 740, the controller 744 and/or the processor 748 may include its own processing memory (e.g., memory 746) for storing computer readable code (e.g., software, software modules) that enables performance of the various functions described herein. For example, the processing memory may store software instructions/computer readable code executable by the processing unit (e.g., computer processor) for performing some or all aspects of methods described herein, including various steps of the method described below with reference to FIG. 9. That is, execution of the instructions/computer readable code generally causes the processing unit of the computer 740 and/or the controller 744 to emulate echo signals reflected from emulated radar targets in response to the radar signals transmitted by the radar DUT 105.

The memory 746, and any other memory described herein, including the database 720, may be various types of random access memory (RAM), read only memory (ROM) and/or other storage media, including flash memory, electrically programmable read-only memory (EPROM), electrically erasable and programmable read only memory (EEPROM), compact disk read only memory (CD-ROM), digital versatile disk (DVD), registers, latches, flip-flops, a hard disk, a removable disk, tape, floppy disk, blu-ray disk, or universal serial bus (USB) driver, or any other form of storage medium known in the art, which are tangible and non-transitory (e.g., as compared to transitory propagating signals). Memories may be volatile or non-volatile, secure and/or encrypted, unsecure and/or unencrypted, without departing from the scope of the present teachings. The memory 746 and the database 720 may be representative of one or more memories and databases, as well as multiple memories and databases, including distributed and networked memories and databases.

Generally, in operation, the radar DUT 105 emits RF radar signals (illustratively mm wave signals) that are focused at a respective one of the antennas 708, which are beneficially comparatively high-gain antennas, of one of the re-illuminators 706. The antenna 708 may be a patch array antenna or a cavity backed antenna selected for the wavelength of signals received from the radar DUT 105. Of course, other types of antennas may be incorporated as the antenna 708, without departing from the scope of the present teachings.

As discussed above, each of the antennas 708 is canted (along with the corresponding re-illuminator 706) to reflect a portion of the radar signal transmitted by the radar DUT 105, thereby directing the reflected portion of the radar signal away from an incident direction of the radar signal at a predetermined deflection angle in order to prevent the radar DUT 105 from receiving the reflected portion of the radar signal. The antenna patterns of the antennas 708 are modified to compensate for the cants of the antennas 708, so that the peak beam of each antenna 708 is squinted at an angle directed toward the radar DUT 105 to increase gain of the antenna 708 in that direction.

The radar signals incident on the antennas 708 are provided to respective ones of the RTSs 710. Based on input from the controller 744, frequency shifting of the incident radar signals is effected in each of the RTSs 710 and beneficially emulates a distance of a target from the radar DUT 105, or a velocity of a target relative to the radar DUT 105, or both. In addition, the azimuth (+x direction the coordinate system of FIG. 7) and the elevation (+z direction in the coordinate system of FIG. 7) are emulated by the antennas 708. The antennas 708 may be part of an electronically steerable antenna array of the re-illuminator 706. Likewise, the re-illuminators 706 may be mechanically moved, instead of or in addition to the antennas 708. The emulated echo signals provided by the RTSs 710 are incident on the radar DUT 105. The computer 740 receives the signals from the radar DUT 105 for further analysis of the accuracy of the radar DUT 105.

Generally, radar utilizing FMCW waveforms operates by transmitting an RF radar signal in the 77 GHz band, for example. The radar signal is modulated such that the instantaneous frequency linearly changes from a first frequency to a second frequency over a predetermined time period, referred to as a chirp signal. The RF frequency may increase linearly (upchirp) over the predetermined time period, where the first frequency (e.g., 77 GHz) is less than the second frequency (e.g., 78 GHz), or the RF frequency may decrease linearly (downchirp) over the predetermined time period, where the first frequency (e.g., 78 GHz) is greater than the second frequency (e.g., 77 GHz). This linear ramp in frequencies is repeated to form a continuous wave signal that is transmitted from the radar.

The transmitted radar signal propagates at the speed of light towards a target, reflects from the target, and returns to the radar as a reflected echo signal, where the echo signal is delayed by the round trip time between the radar and the target. The length of this delay corresponds to a distance between the radar and the target. The echo signal is then mixed with a currently transmitted radar signal in the radar, an operation known as homodyne reception. A resulting IF signal has a frequency equal to the instantaneous difference between the frequency of the received echo signal and the frequency of the currently transmitted radar signal at the radar.

That is, owing to the delay in the received echo signal and the linear ramp in frequencies of the transmitted radar signal over the predetermined time period, there will be a frequency difference between the currently transmitted radar signal (which has linearly changed in frequency) and the received echo signal (which is at the frequency of the originally transmitted radar signal). This frequency difference is therefore proportional to the roundtrip delay multiplied by the frequency sweep rate in Hertz per second (Hz/s). For example, since close targets are delayed less than distant targets, the close emulated targets will result in a smaller frequency difference and thus a lower IF signal frequency than more distant emulated targets. When the emulated target is a point target, the resultant IF signal will be a single tone at a single frequency. When the emulated target comprises multiple targets, the resultant IF signal has multiple tones with frequencies corresponding to the instantaneous ranges to respective targets. In the general case considering N targets, the IF signal at the radar will comprise N tones, the frequency of each tone corresponding to the range to a corresponding target and the amplitude of each tone corresponding to the relative received strength of echo signal from that target. Notably, the received strength is a function of range to the target from the radar, as well as reflectivity of the target per the target's RCS. For a given target RCS, the strength is generally inversely proportional to the range according to the function $1/R^4$, where R is the distance between the radar and the target.

In this context, the representative embodiments of the present disclosure utilize frequency offsets provided by the RTSs 710 to emulate ranges to emulated targets from the radar DUT 105. Using frequency offset, each emulated target is indicated by an effective frequency shift due to the propagation delay. However, rather than delaying transmission of the echo signal to indicate the range, the delay itself is emulated by the frequency offset transceiver imparting the expected frequency shift corresponding to the desired delay to the echo signal. For example, as discussed in more detail below, the radar signal transmitted from the radar DUT 105 may be mixed at the RTS 710 by a frequency offset signal using a single-sideband (SSB) mixer. This frequency offset signal has a frequency (or pattern of frequencies) equal to the required frequency shift that would be present in the echo signal that corresponds to the delay (or round trip difference). Indeed, the frequency offset signal is exactly of the form of the desired IF signal at the radar DUT 105 upon receiving the echo signal and mixing it with the currently transmitted radar signal. Thus, a single emulated target at a first range would result in an IF signal at the radar DUT 105 comprised of a single tone with a frequency representing the range to the single target. This can be produced using the SSB mixer in the RTS 710 by using the desired IF signal as the frequency offset signal. Multiple emulated targets would result in an IF signal comprised of multiple tones. Utilizing this multi-tone IF signal as the offset signal thus results in an echo signal that emulates the multiple emulated targets.

Figure 8:
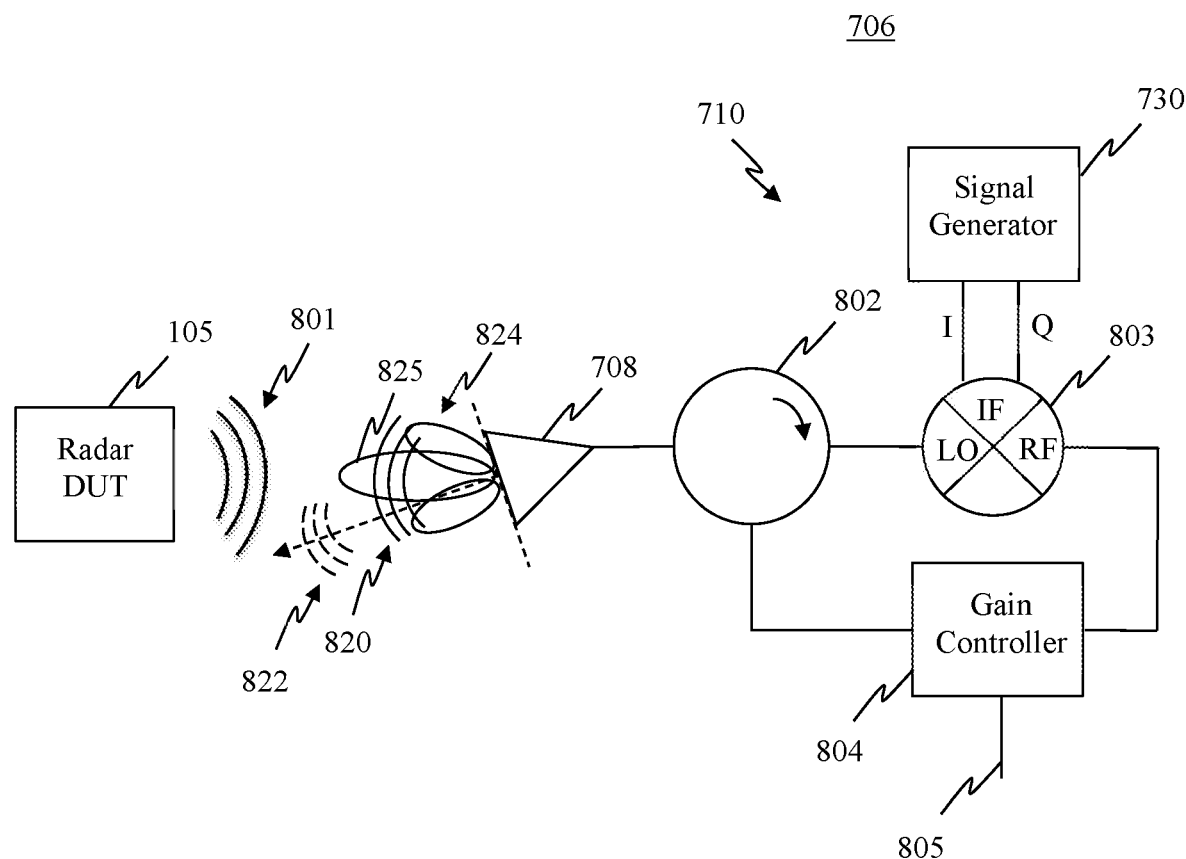
FIG. 8 is a simplified block diagram of a representative RTS of FIG. 7 for emulating echo signals with reduced interference from reflection, according to a representative embodiment.

FIG. 8 is a simplified block diagram of a representative re-illuminator (and corresponding RTS or frequency offset transceiver) of FIG. 7, for emulating echo signals with reduced interference from reflection, according to a representative embodiment. Aspects of the RTS described in connection with the representative embodiment may be common to all the RTSs.

Referring FIG. 8, re-illuminator 706 includes antenna 708 and RTS 710 connected to the antenna 708, as described above. Of course, in practice, there may be more than one RTS 710 in a system, and thus more than one antenna 708 (e.g., as depicted in the representative embodiment of FIG. 7). The antenna 708 is configured to receive a radar signal 801 over-the-air from the radar DUT 105. The RTS 710 is configured to generate an emulated echo signal 820 in response to the radar signal indicating an emulated target, where the emulated echo signal 820 is transmitted by the antenna 708 and received by the radar DUT 105. The emulated echo signal 820 indicates range to the emulated target from the radar DUT 105 based on the scene emulation, e.g., stored in the database 720. In addition, a reflected portion 822 of the radar signal is reflected by the antenna 708 and the RTS 710. If uncorrected, the reflected portion 822 may be received by the radar DUT 105, creating a ghost target and interfering with the emulated echo signal 820.

In the depicted embodiment, the RTS 710 includes a circulator 802, the I/Q mixer 803 and the signal generator 730. The circulator 802 enables the RTS 110 to use a single antenna 708 for receiving the radar signals 801 from the radar DUT 105, and transmitting the emulated echo signals 820 to the radar DUT 105. Alternatively, the antenna 708 may be implemented as separate receive and transmit antennas, without departing from the scope of the present teachings, in which case the circulator 802 may be omitted.

The I/Q mixer 803 may be an SSB mixer, for example, with standard 90 degrees phasing of the radar signal, resulting in an output of either the upper sideband (USB) or the lower sideband (LSB), rejecting the LSB or USB, respectively. The signal generator 730 may be implemented using a direct digital synthesizer (DDS), or an FPGA and a digital-to-analog converter (DAC), for example, although other types of controllable signal generators may be incorporated without departing from the scope of the present teachings. The signal generator 730 is controllable, e.g., by the computer 740, to provide I and Q signals of various magnitudes and phases. The signal generator 730 is also controllable to separately adjust DC values (DC offsets) of the I and Q signals, as discussed below.

In the depicted embodiment, the I/Q mixer 803 includes an LO port, an RF port and an IF port, where the LO port is configured to receive the radar signal 801 from the antenna 708, and the IF port is configured to receive the I and Q signals from the signal generator 730. The I/Q mixer 803 mixes the radar signal with the I and Q signals, and outputs the mixing product as an RF signal from the RF port ultimately to be provided as the emulated echo signal 820, e.g., following amplification and/or attenuation. Although not shown, it is understood that the RTS 710 may further include signal processing components, e.g., filters, attenuators and/or amplifiers, for processing the radar signal 801 prior to the radar signal 801 being input to the I/Q mixer as the LO signal.

The RF signal output from the I/Q mixer 203 may be provided to a gain controller 804, such as a variable gain amplifier (VGA) or an output attenuator, which comprises a gain control input 805. As alluded to above, the gain control input 805 of the gain controller 804 may be controlled by the computer 740. The gain controller 804 further enables proper emulation of the echo signal 820 responsive to the radar signal 801 from the radar DUT 105 at the antenna 708. Notably, the power of the emulated echo signal 820 from the antenna 708 is an indication of the RCS of an emulated target. As such, the gain or attenuation provided by the gain controller 804 is selected at the gain control input 805 based on the power of the radar signal incident on the antenna 708, and the RCS at the desired emulation distance of the emulated target.

The RF signal is transmitted back to the radar DUT 105 by the RTS 710 through the antenna 708. As discussed above, antenna pattern 824 of the antenna 708 is adjusted so that the peak beam 825 of the antenna pattern 824 is squinted at an angle that directs the peak beam 825 in a direction toward the radar DUT 105. This beam squinting compensates for the blaze angle of the antenna 708, so that the maximum gain of the antenna pattern is directed toward the radar DUT 105 for receiving the radar signal 801 and transmitting the emulated echo signal 820, even though the antenna 708 is angled way from the incidence direction of the radar signal 801 for deflecting the reflected portion 822 away from the radar DUT 105.

Additional discussion of echo signal emulation systems is provided, for example, in U.S. patent application Ser. No. 17/148,230 to Christian Bourde et al., filed Jan. 13, 2021, which is incorporated herein by reference in its entirety.

Generally, control of the re-transmitted power is used to emulate a consistent RCS. The RCS may be stored in look-up in tables in the database 720, for example. To this end, for a given range R to an emulated target, it is known that magnitude (strength) of the return echo signal is proportional to RCS and falls as $1/R^4$. A vehicle is typically quoted as being 10 dBsm, which is measuring area, meaning 10 dB relative to a square meter (s.m.), or 10 square meters. Many objects have been tabulated (vehicles, pedestrians, bicycles, buildings, etc.), and those that have not may be calculated by ray tracing techniques. By the present teachings, emphasis is placed on providing a return echo signal strength to the radar DUT 105 that is commensurate with the distance R (obeying the well-known $1/R^4$ radar decay law) and the accepted value of RCS for the particular object. In accordance with a representative embodiment, the signal strength (and thus power) is adjusted by adjusting the strength of the I and Q signals, with a weaker I and Q signals providing comparatively weaker emulated echo signals. Notably, in certain representative embodiments, the computer 740 precomputes the consistent return echo signal provided to the single point of focus at the radar DUT 105, and the controller 744 then adjusts the strength of the I and Q signals to achieve this SSB strength. Alternatively, and beneficially, the gain or attenuation of a gain controller of the RTS 710 may be adjusted to control SSB strength of the return echo signal.

When the radar DUT 105 is an FMCW device, the distance/velocity is emulated electronically using the RTS 710. To this end, FMCW radar systems use chirped waveforms, as discussed above, whereby the correlation of the original transmit (Tx) waveform from the radar DUT 105 with the received (Rx) echo waveform reveals the target distance. For example, in upchirp/downchirp systems with chirp rates of $\pm k_{sw}$ (measured in Hz/s), a target at a distance d and zero relative velocity to the ego vehicle with the radar DUT 105 will result in a frequency shift ($\delta f$) given by Equation (2), where c is the speed of light and the factor of 2 is due to the roundtrip propagation of the signal from the radar DUT 105:

$$\delta f = \pm (2 k_{sw} d/c) \qquad \text{Equation (2)}$$

The sign of the shift depends on which part of the waveform, upchirp vs. downchirp, is being processed. In contrast, Doppler shifts due to relative velocity manifest as "common mode" frequency shifts, e.g., a net upshift over both halves of the waveform indicates the radar DUT is approaching closer to the target. Correlation is performed in the radar DUT's IF/baseband processor; bandwidths of a few MHz are typical.

A commonly deployed variation of FMCW radar systems uses repetitive upchirps, or repetitive downchirps, but not both (with intervening dead times). As such, the distance to an emulated target is determined as in the previous paragraph, now without the sign issue. Relative velocity is determined by measuring the phase shift between successive frame IF correlation signals, where frame is a term of art for one period of the waveform. In many FMCW radar applications, the frame repetition rate is typically a few kHz to few tens of kHz.

Figure 9A:
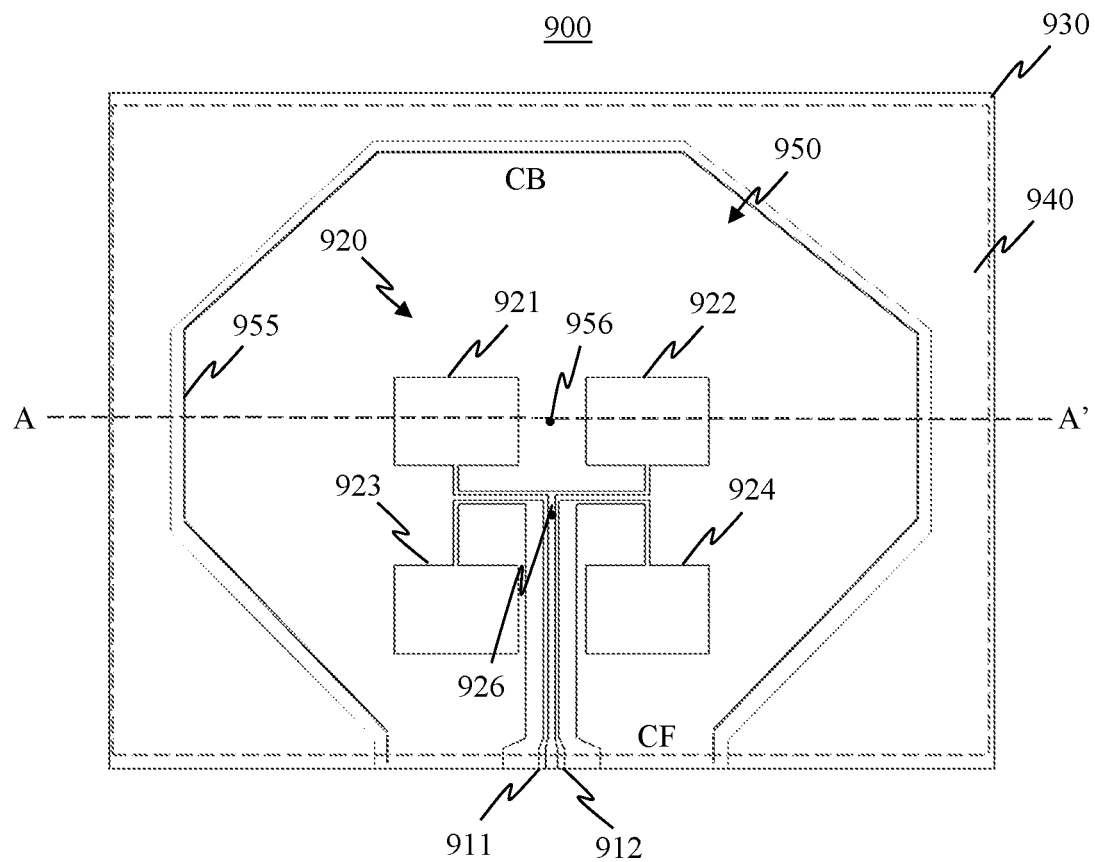
FIG. 9A is a simplified top plan view of an example of a cavity backed antenna of an RTS for horizontal or vertical beam squinting, according to a representative embodiment.

Of course, types of antennas with steerable peak beams other than patch array antennas may be incorporated for use with the RTSs, without departing from the scope of the present teachings. For example, in alternative embodiments, the antenna(s) of each RTS may be a cavity backed antenna, including a plated air cavity in a substrate, and a dipole antenna arranged on the substrate over the air cavity such that the air cavity acts as a reflector. FIG. 9A is a simplified top plan view of an example of a cavity backed antenna of an RTS for vertical beam squinting, according to a representative embodiment, and FIG. 9B is a simplified cross-sectional view of the cavity backed antenna in FIG. 9A taken along line A-A', according to a representative embodiment.

Figure 9B:
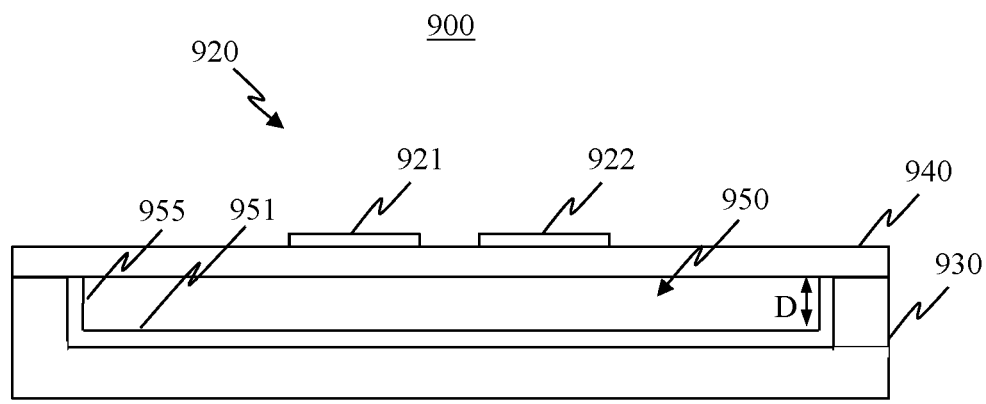
FIG. 9B is a simplified cross-sectional view of the cavity backed antenna in FIG. 9A, according to a representative embodiment.

Referring to FIGS. 9A and 9B, plated cavity backed antenna 900 includes feedlines 911 and 912 connected to a dipole antenna 920, which includes four representative antenna elements 921, 922, 923 and 924 formed on antenna dielectric 940 (transparent in FIG. 9A) over reflective air cavity 950. Of course, alternative types of antenna configurable to radiate downward into the air cavity 950 and/or numbers of antenna elements may be incorporated without departing from the scope of the present teachings. The plated cavity backed antenna 900 further includes printed circuit board (PCB) 930, where the air cavity 950 is formed at depth D within the PCB 930. The PCB 930 may be formed of three layers, including a bottom copper layer, a dielectric layer, and top copper layer, for example, and the air cavity 950 may be formed through the top copper and dielectric layers. The air cavity 950 is plated with conductive plating, which may be formed of copper, for example, providing a cavity floor 951 and a cavity sidewalls 955, which permit the air cavity 950 to act as a reflector for the dipole antenna 920. In the depicted configuration, the dipole antenna 920 radiates through the antenna dielectric 940 into the air cavity 950 and is reflected at the cavity floor 951 and sidewalls 955 to re-radiate back up through the antenna dielectric 940.

The antenna pattern of the plated cavity backed antenna 900, including the direction of the peak beam, is a function of the position of the dipole antenna 920 relative to the air cavity 950. The shape and the depth of the air cavity 950 generally influence overall performance of the plated cavity backed antenna 900. Therefore, the antenna pattern of the dipole antenna 920 may be changed by altering the relative position of the dipole antenna 920 to provide a desired beam squint angle. The shape and the depth of the air cavity 950 generally influence overall performance of the plated cavity backed antenna 900.

For example, when a plated cavity backed antenna is designed to radiate with no squint angle, the phase center of the dipole antenna is placed over the physical center of the cavity. When the phase center of the dipole antenna is positioned elsewhere within the cavity, the resulting antenna pattern has a peak beam that is squinted in a direction and amount determined by the relationship between the phase center and the cavity physical center. For example, in FIG. 9A, antenna phase center 926 (the center of the antenna elements 921, 922, 923 and 924) is positioned closer toward the cavity front CF in relation to cavity physical center 956. Therefore, the dipole antenna 920 will be reflected at a squint angle opposite the direction that the antenna phase center 926 is offset from the cavity physical center 956, which in the depicted example would be toward the cavity back CB. Generally, the more the antenna phase center 926 is offset from the cavity physical center 956, the greater amount of beam squint.

Similarly, the dipole antenna 920 may be reflected at a squint angle toward the cavity front CF by offsetting the antenna phase center 926 from the cavity physical center 956 toward the cavity back CB. Also, the dipole antenna 920 may be reflected at squint angles toward the right and left of air cavity by offsetting the antenna phase center 926 from the cavity physical center 956 toward the left and right, respec-
tively. Thus, generally, the direction of the beam squint may be effectively steered in different directions about 180 degrees opposite from whatever offset direction the antenna phase center 926 is positioned from the cavity physical center 956. The directions and amounts of beam squinting may be determined empirically.

Figure 10:
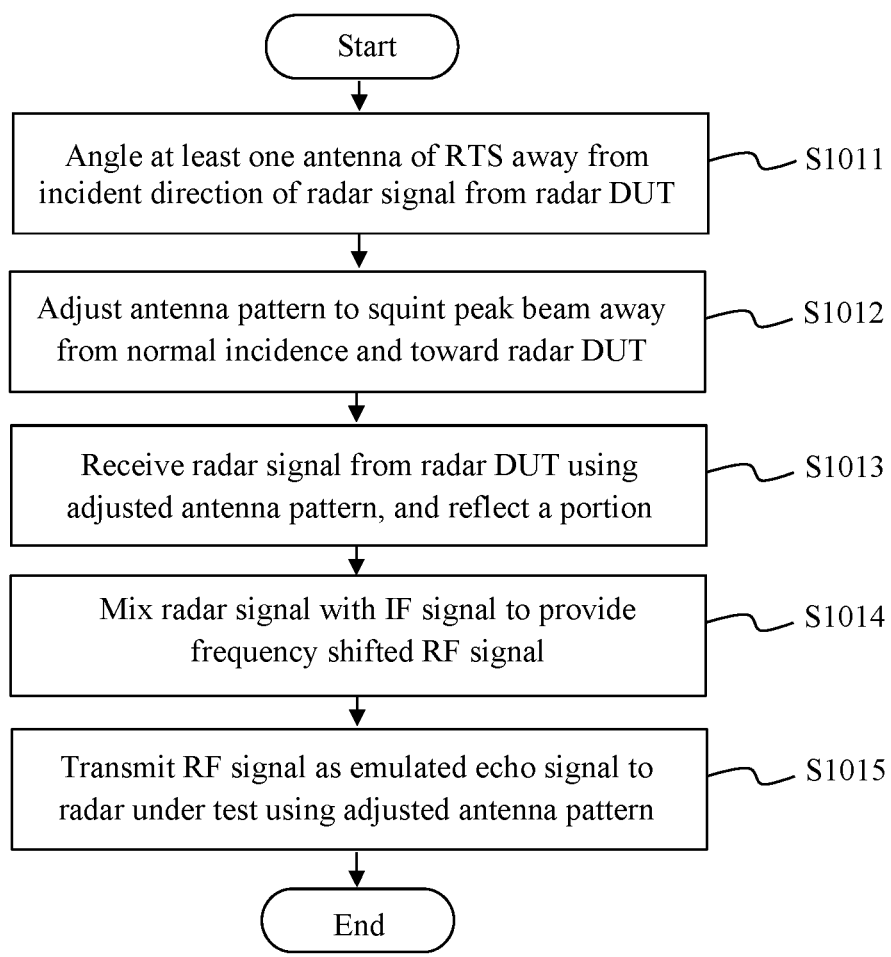
FIG. 10 is a flow diagram showing a method for emulating echo signals with reduced interference from reflection, according to a representative embodiment.

FIG. 10 is a flow diagram showing a method for emulating echo signals in response to a radar signal transmitted by a radar DUT with reduced interference from reflection, according to a representative embodiment. The method may be implemented by the system 100 and/or the system 700, discussed above, under control of the computer 740, for example.

Referring to FIG. 1, in block S1011, at least one antenna of an RTS (e.g., RTS 121, 122, 123) is angled away from an incident direction of a radar signal to be transmitted by the radar DUT. The angle may be referred to as a blaze angle. The blaze angle is great enough such that a reflected portion of the radar signal, emitted in an incident direction from the radar DUT, is reflected from the at least one antenna and other surfaces of the RTS, located in a mid-field or far-field (i.e., outside a near-field), of the radar DUT, in a direction that causes the reflected portion to bypass the radar DUT.

In block S1012, the antenna pattern of the at least one antenna is adjusted (squinted) to angle a peak beam of the antenna pattern away from a normal incidence of the at least one antenna at a beam squint angle, and toward the radar DUT. The beam squint angle thus compensates for the at least one antenna being angled away from the incidence direction of the radar signal, so that the maximum gain of the antenna pattern is still directed toward the radar DUT.

In block S1013, a radar signal is received over-the-air from the radar DUT at the at least one antenna using the adjusted antenna pattern. A reflected portion of the radar signal is reflected by the at least one antenna, as well as other surfaces of the RTS, away from the incident direction of the radar signal at a predetermined deflection angle determined by the blaze angle of the at least one antenna. The predetermined deflection angle is twice the blaze angle.

In block S1014, the received radar signal is mixed by a frequency offset transceiver with a generated IF signal to provide an RF signal having an RF frequency shifted from a radar frequency of the radar signal in an amount indicating a distance to the emulated target, as discussed above. The RF signal may be amplified/attenuated as needed to accurately represent an RCS of the emulated target.

In block S1015, the RF signal is transmitted to the radar DUT as the emulated echo signal via the at least one antenna using the adjusted antenna pattern. The beam squint angle of the adjusted antenna pattern compensates for the predetermined deflection angle in order to direct the peak beam toward the radar DUT for receiving the radar signal and transmitting the RF signal. The radar under test receives the emulated echo signal without interference otherwise caused by the reflected portion of the radar signal, thereby avoiding the appearance of ghost targets.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A system for emulating an echo signal reflected from an emulated target in response to a radar signal transmitted by a radar device under test (DUT), the system comprising:
   at least one antenna positioned outside a near-field of the radar DUT, and configured to receive the radar signal over-the-air from the radar DUT, wherein the at least one antenna reflects a portion of the radar signal and is configured to direct the reflected portion of the radar signal away from an incident direction of the radar signal at a predetermined deflection angle to prevent the radar DUT from receiving the reflected portion of the radar signal, the incident direction being substantially perpendicular to a wavefront of the radar signal; and
   a transceiver coupled to the at least one antenna to receive the radar signal, wherein the transceiver is configured to mix the received radar signal with a generated signal having a frequency that provides a radio frequency (RF) signal having an RF frequency shifted from a radar frequency of the radar signal in an amount indicating a distance to the emulated target, and to transmit the RF signal to the radar DUT as an emulated echo signal via the at least one antenna,
   wherein the at least one antenna has an antenna pattern comprising a peak beam angled away from a normal incidence of the at least one antenna at a beam squint angle, the beam squint angle compensating for the predetermined deflection angle in order to direct the peak beam toward the radar DUT for receiving the radar signal and transmitting the RF signal.

2. The system of claim 1, wherein the at least one antenna comprises a patch array antenna, wherein the patch array antenna comprises a ground plane mirror canted at a blaze angle from the incident direction of the radar signal, the predetermined deflection angle being about twice the blaze angle.

3. The system of claim 2, wherein the blaze angle is the same value as and opposite to the squint angle.

4. The system of claim 2, wherein the patch array antenna further comprises:
   a plurality of microstrips extending in parallel from at least one feed source; and
   a plurality of patch elements connected to the plurality of microstrips, and arranged in parallel rows across the plurality of microstrips, wherein adjacent rows of the parallel rows are offset an electrical degree distance from one another to produce a phase gradient between the adjacent rows to provide the beam squint angle of the patch array antenna.

5. The system of claim 4, wherein the at least one feed source comprises an unbalanced port.

6. The system of claim 4, wherein the at least one feed source comprises balanced differential ports.

7. The system of claim 1, wherein the at least one antenna comprises a plated cavity backed antenna comprising a plated air cavity in a substrate, and a dipole antenna arranged on the substrate over the air cavity such that the air cavity acts as a reflector, and wherein a position of the dipole antenna relative to a cavity physical center of the air cavity changes the antenna pattern of the dipole antenna to provide the beam squint angle of the cavity backed antenna.

8. The system of claim 7, wherein the beam squint angle is in an opposite direction from an offset position of an antenna phase center of the dipole antenna from the cavity physical center.

9. The system of claim 1, wherein the predetermined deflection angle and the squint angle are in a substantially vertical plane with respect to the incident direction of the radar signal.

10. The system of claim 1, wherein the predetermined deflection angle and the squint angle are in a substantially horizontal plane with respect to the incident direction of the radar signal.

11. A method for emulating an echo signal reflected from an emulated target in response to a radar signal transmitted by a radar device under test (DUT), the method comprising:
   angling at least one antenna of a radar target simulator (RTS) at a blaze angle with respect to an incidence direction of a radar signal to be transmitted by the radar DUT, wherein the at least one antenna is outside a near-field of the radar DUT;
   adjusting an antenna pattern of the at least one antenna to angle a peak beam of the antenna pattern away from a normal incidence of the at least one antenna at a beam squint angle;
   receiving a radar signal over-the-air from the radar DUT using the adjusted antenna pattern, and reflecting a portion of the radar signal away from the incident direction of the radar signal at a predetermined deflection angle due to the blaze angle of the at least one antenna to prevent the radar DUT from receiving the reflected portion of the radar signal;
   mixing the received radar signal with a locally generated signal having a frequency that provides a radio frequency (RF) signal having an RF frequency shifted from a radar frequency of the radar signal in an amount indicating a distance to the emulated target; and
   transmitting the RF signal to the radar DUT as an emulated echo signal via the at least one antenna using the adjusted antenna pattern,
   wherein the beam squint angle compensates for the predetermined deflection angle in order to direct the peak beam toward the radar DUT for receiving the radar signal and transmitting the RF signal.

12. The method of claim 11, wherein the at least one antenna comprises a patch array antenna having a ground plane mirror canted at the blaze angle from the incident direction of the radar signal, the predetermined deflection angle being about twice the blaze angle.

13. The method of claim 12, wherein the blaze angle is the same value as and opposite to the beam squint angle.

14. The method of claim 11, wherein the at least one antenna comprises a plated cavity backed antenna having a plated air cavity in a substrate, and a dipole antenna arranged on the substrate over the air cavity such that the air cavity acts as a reflector, and wherein a position of the dipole antenna relative to a cavity physical center of the air cavity changes the antenna pattern of the dipole antenna to provide the beam squint angle of the cavity backed antenna.

15. The method of claim 14, wherein the beam squint angle is in an opposite direction from an offset position of an antenna phase center of the dipole antenna from the cavity physical center.

16. The method of claim 11, wherein the predetermined deflection angle and the beam squint angle are in a substantially vertical plane with respect to the incident direction of the radar signal.

17. The method of claim 11, wherein the predetermined deflection angle and the beam squint angle are in a substantially horizontal plane with respect to the incident direction of the radar signal.

18. An antenna system for receiving a radar signal transmitted by a radar device under test (DUT) outside a near-field of the radar DUT, and transmitting an emulated echo signal reflected from an emulated target to the radar DUT in response to the radar signal, the antenna system comprising:
- a plurality of microstrips extending in parallel from at least one feed source;
- a plurality of matching feedlines connected to the plurality of microstrips;
- a plurality of patch elements connected to the plurality of microstrips, and arranged in parallel rows across the plurality of microstrips; and
- a ground plane for the plurality of patch elements, wherein at least the ground plane is angled to reflect a portion of the radar signal away from an incident direction of the radar signal at a predetermined deflection angle to prevent the radar DUT from receiving the reflected portion of the radar signal, the incident direction being substantially perpendicular to a wavefront of the radar signal, wherein an antenna pattern of the antenna system comprises a peak beam angled away from a normal incidence of the ground plane at a beam squint angle, the beam squint angle compensating for the predetermined deflection angle in order to direct the peak beam toward the radar DUT for receiving the radar signal and transmitting the emulated echo signal.

19. The antenna system of claim 18, wherein the beam squint angle is in a substantially horizontal plane with respect to the incident direction of the radar signal, and is a function of respective lengths of the plurality of matching feedlines.

20. The antenna system of claim 18, wherein the beam squint angle is in a substantially vertical plane with respect to the incident direction of the radar signal, and is a function of lengths between adjacent patch elements on each of the plurality of microstrips.

* * * * *